United States Patent
Mimura et al.

(10) Patent No.: US 11,292,415 B2
(45) Date of Patent: Apr. 5, 2022

(54) AIRBAG DEVICE AND VEHICLE

(71) Applicant: HONDA MOTOR CO., LTD., Tokyo (JP)

(72) Inventors: Yoshitaka Mimura, Wako (JP); Masahiko Asakura, Wako (JP); Hironori Takano, Wako (JP); Junichi Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 131 days.

(21) Appl. No.: 16/342,991

(22) PCT Filed: Dec. 21, 2016

(86) PCT No.: PCT/JP2016/088099
§ 371 (c)(1),
(2) Date: Apr. 18, 2019

(87) PCT Pub. No.: WO2018/116402
PCT Pub. Date: Jun. 28, 2018

(65) Prior Publication Data
US 2020/0055481 A1    Feb. 20, 2020

(51) Int. Cl.
*B60R 21/203*    (2006.01)
*B62D 1/18*     (2006.01)
(Continued)

(52) U.S. Cl.
CPC .............. *B60R 21/203* (2013.01); *B62D 1/18* (2013.01); *B60R 25/0215* (2013.01);
(Continued)

(58) Field of Classification Search
CPC .............. B60R 21/203; B60R 21/0134; B60R 21/2032; B60R 21/214; B60R 25/0215;
(Continued)

(56) References Cited

U.S. PATENT DOCUMENTS 3,362,247 A * 1/1968 Watts ....................... B62D 1/18
                                                 74/493
5,507,521 A    4/1996 Steffens
(Continued)

FOREIGN PATENT DOCUMENTS

CN    104925112    9/2015
CN    205381300    7/2016
(Continued)

OTHER PUBLICATIONS

Japanese Office Action for Japanese Patent Application No. 2018-557451 dated Feb. 25, 2020.
(Continued)

*Primary Examiner* — Frank B Vanaman
(74) *Attorney, Agent, or Firm* — Amin, Turocy & Watson, LLP

(57) ABSTRACT

An airbag device includes: an airbag body that is configured to deploy toward a front side of a driver; and a control unit that is configured to deploy the airbag body using a first deployment method when a central axis of a rim portion of a steering member of a vehicle is in a first state and a deployment condition is satisfied and deploy the airbag body using a second deployment method in a second state when an inclination angle of the central axis in relation to the central axis in the first state exceeds a threshold and the deployment condition is satisfied.

6 Claims, 17 Drawing Sheets

(51) Int. Cl.
  *B60R 25/0215* (2013.01)
  *B60R 21/00* (2006.01)
  *B60R 21/217* (2011.01)
  *B62D 1/10* (2006.01)

(52) U.S. Cl.
  CPC .............. *B60R 2021/0032* (2013.01); *B60R 2021/2173* (2013.01); *B62D 1/10* (2013.01)

(58) Field of Classification Search
  CPC .... B60R 2021/0032; B60R 2021/2173; B62D 1/18; B62D 1/10; B62D 1/183
  See application file for complete search history.

(56) References Cited

U.S. PATENT DOCUMENTS

| | | | |
|---|---|---|---|
| 7,234,727 | B2 | 6/2007 | Mori et al. |
| 2004/0188991 | A1* | 9/2004 | Schneider ........... B60R 21/2338 280/743.2 |
| 2007/0029771 | A1* | 2/2007 | Haglund ................ B62D 1/197 280/775 |
| 2007/0235995 | A1 | 10/2007 | Shiga et al. |
| 2010/0264629 | A1* | 10/2010 | Gandhi ................ B60R 21/203 280/728.2 |
| 2013/0001936 | A1* | 1/2013 | Nagasawa ............. B60R 21/233 280/731 |
| 2015/0142246 | A1* | 5/2015 | Cuddihy ................ B60R 21/20 701/23 |
| 2016/0325662 | A1 | 11/2016 | Nash et al. |
| 2016/0375860 | A1 | 12/2016 | Lubischer et al. |
| 2016/0375923 | A1 | 12/2016 | Schulz et al. |
| 2016/0375925 | A1 | 12/2016 | Lubischer et al. |
| 2016/0375927 | A1 | 12/2016 | Schulz et al. |
| 2017/0008475 | A1* | 1/2017 | Kruse ................... B60R 21/013 |
| 2017/0096118 | A1* | 4/2017 | Kruse ................... B60R 21/203 |
| 2017/0113589 | A1 | 4/2017 | Riefe |
| 2020/0031304 | A1* | 1/2020 | Malapati ............. B60R 21/2035 |

FOREIGN PATENT DOCUMENTS

| | | |
|---|---|---|
| DE | 10261178 | 6/2004 |
| JP | 61-153672 | 9/1986 |
| JP | 03-176251 | 7/1991 |
| JP | 05-008737 | 1/1993 |
| JP | 05-105014 | 4/1993 |
| JP | 10-287193 | 10/1998 |
| JP | 11-078910 | 3/1999 |
| JP | 2005-254884 | 9/2005 |
| JP | 2006-168477 | 6/2006 |
| JP | 2008-195157 | 8/2008 |
| JP | 2012-001125 | 1/2012 |
| JP | 2016-175513 | 10/2016 |

OTHER PUBLICATIONS

International Search Report and Written Opinion for International Application No. PCT/JP2016/088099 dated Mar. 7, 2017, 11 pgs.
Chinese Office Action for Chinese Patent Application No. 201680089951.8 dated Dec. 23, 2020.

* cited by examiner

AIRBAG DEVICE AND VEHICLE

TECHNICAL FIELD

The present invention relates to an airbag device and a vehicle.

BACKGROUND ART

An airbag device in which a bag body inflates and deploys when an impact is input to protect an occupant is installed on a front side of a driver's seat of a vehicle. The airbag device has an inflator that generates high-pressure gas when an impact is input and a bag body that inflates and deploys in response to the gas of the inflator, and is disposed inside a steering wheel.

CITATION LIST

Patent Literature

Patent Document 1: Japanese Unexamined Patent Application, First Publication No. 2012-1125

SUMMARY OF INVENTION

Technical Problem

However, a technology of changing an inclination angle of a steering wheel during an automated driving mode has been developed recently in order to widen the space on the front side of the body of a driver. However, when the inclination angle of the steering wheel changes, since a deployment direction of a bag body of an airbag device disposed inside the steering wheel also changes, there is a possibility that it is not possible for the inflated and deployed bag body to accommodate the head of an occupant.

The present invention provides an airbag device and a vehicle capable of enhancing occupant protection performance.

Solution to Problem (1) An airbag device according to an aspect of the present invention includes: an airbag body that is configured to deploy toward a front side of a driver; and a control unit that is configured to deploy the airbag body using a first deployment method when a central axis of a rim portion of a steering member of a vehicle is in a first state and a deployment condition is satisfied and deploy the airbag body using a second deployment method in a second state when an inclination angle of the central axis in relation to the central axis in the first state exceeds a threshold and the deployment condition is satisfied.

According to the present invention, since the deployment method of the airbag body is changed when the inclination angle of the central axis of the rim portion exceeds the threshold, the airbag body can be always deployed to a position effective for the driver regardless of the inclination angle of the central axis of the rim portion even when the rim portion is inclined from the first state. Therefore, it is possible to enhance occupant protection performance.

(2) In the airbag device according to aspect (1), the inclination angle may be an angle about an axis extending in a vehicle width direction.

Due to the above-described configuration, when the rim portion is formed so as to rotate about the axis extending in the vehicle width direction, the airbag body can be always deployed to a position effective for the driver regardless of the inclination angle of the central axis. Therefore, it is possible to enhance occupant protection performance.

(3) In the airbag device according to aspect (1) or (2), the airbag body may include a first airbag body and a second airbag body disposed inside the steering member, the second airbag body may be formed to be deployed in a direction different from a deployment direction of the first airbag body in relation to the rim portion, and the control unit may deploy the second airbag body when the inclination angle exceeds the threshold and the deployment condition is satisfied.

Due to the above-described configuration, since the second airbag that is configured to deploy in a direction different from the deployment direction of the first airbag body in relation to the rim portion is deployed when the inclination angle of the central axis of the rim portion exceeds the threshold and the deployment condition is satisfied, the second airbag body can be deployed to a position effective for the driver when the first airbag body is not effective for the driver. Therefore, it is possible to enhance occupant protection performance.

(4) In the airbag device according to aspect (3), the first airbag body may be disposed inside a first member of the steering member, which is displaced integrally with the rim portion, and the second airbag body may be disposed inside a second member of the steering member, which supports the first member so as to be displaceable.

Due to the above-described configuration, since the second airbag body is disposed inside the second member that supports the first member that is displaced integrally with the rim portion so as to be displaceable, the second airbag body can be deployed in a direction different from the deployment direction of the first airbag body in relation to the rim portion. Due to this, the second airbag body can be deployed to a position effective for the driver when the first airbag body is not effective for the driver. Therefore, it is possible to enhance occupant protection performance.

(5) In the airbag device according to aspect (3), the first airbag body and the second airbag body may be disposed inside a member of the steering member, which is displaced integrally with the rim portion.

Due to the above-described configuration, the deployment direction of the first airbag body and the deployment direction of the second airbag body change according to the inclination angle of the central axis of the rim portion. Due to this, by forming the second airbag body so that the deployment direction thereof is directed toward the driver in a state in which the inclination angle of the central axis of the rim portion exceeds the threshold, the second airbag body can be deployed to a position effective for the driver when the first airbag body is not effective for the driver. Therefore, it is possible to enhance occupant protection performance.

(6) In the airbag device according to aspect (1) or (2), the airbag body may include a first airbag body and a second airbag body, the first airbag body may be disposed inside a member of the steering member, which is displaced integrally with the rim portion, the second airbag body may be formed so as to be deployed toward a front-side position of a driver's seat from an upper side or a lateral side of the driver's seat, and the control unit may deploy the second airbag body when the inclination angle exceeds the threshold and the deployment condition is satisfied.

Due to the above-described configuration, the second airbag body can be deployed to a position effective for the driver from the upper side or the lateral side of the driver's seat when the inclination angle of the central axis of the rim portion exceeds the threshold and the first airbag body disposed inside a member of the steering wheel, which is displaced integrally with the rim portion, is not effective for the driver. Therefore, it is possible to enhance occupant protection performance.

(7) In the airbag device according to aspect (6), the second airbag body may be disposed inside a roof of the vehicle or inside a door of the vehicle.

Due to the above-described configuration, the second airbag body can be deployed to a position effective for the driver from the upper side or the lateral side of the driver's seat. Therefore, it is possible to enhance occupant protection performance.

(8) In the airbag device according to any one of aspects (3) to (7), the deployment of the first airbag body may be inhibited when the inclination angle exceeds the threshold.

Due to the above-described configuration, it is possible to prevent the first airbag body from being deployed unnecessarily when the first airbag body is not effective for the driver.

(9) A vehicle according to an aspect of the present invention includes: the airbag device according to any one of aspects (1) to (8); an automated driving controller that is configured to execute driving assistance in a host vehicle; and an inclination control unit that is configured to change the inclination angle according to a state of driving assistance executed by the automated driving controller.

According to the present invention, even when the steering member is inclined according to the state of driving assistance in a vehicle in which driving assistance (automated driving) is executed, the airbag body can be always deployed to a position effective for the driver. Therefore, it is possible to enhance occupant protection performance.

Advantageous Effects of Invention

According to the above-described airbag device, since the deployment method of the airbag body is changed when the inclination angle of the central axis of the rim portion exceeds the threshold, the airbag body can be always deployed to a position effective for the driver regardless of the inclination angle of the central axis of the rim portion even when the rim portion is inclined from the first state. Therefore, it is possible to enhance occupant protection performance.

DESCRIPTION OF EMBODIMENTS

Hereinafter, embodiments of the present invention will be described with reference to the drawings.

Figure 1:
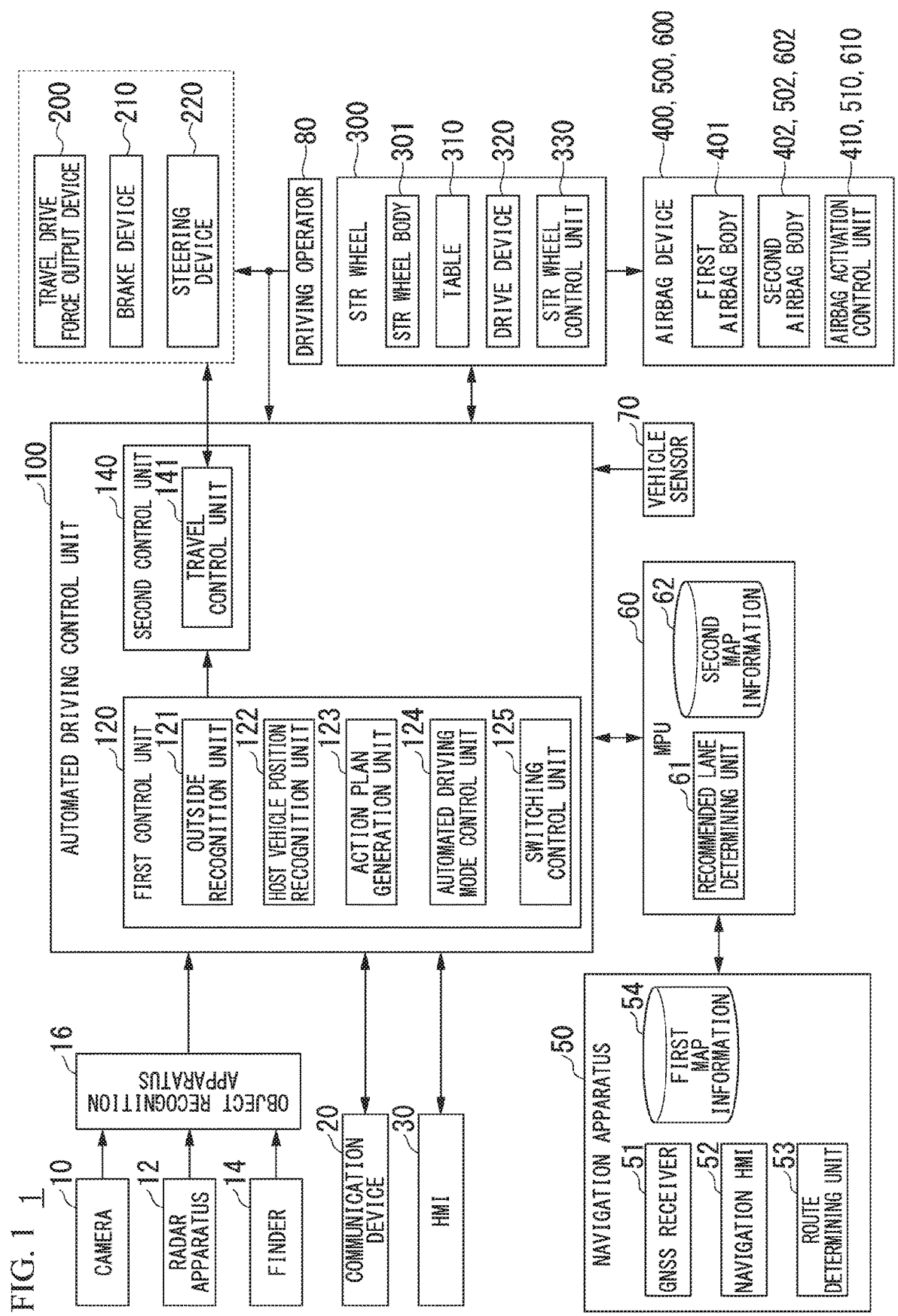
FIG. 1 is a block diagram of a vehicle system 1 according to each embodiment.

FIG. 1 is a block diagram of a vehicle system 1 according to each embodiment, including an automated driving control unit 100 (an automated driving controller). A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or an electric power discharged by secondary batteries or fuel-cell batteries.

First Embodiment

As shown in FIG. 1, a vehicle system 1 includes, for example, a camera 10, a radar apparatus 12, a finder 14, an object recognition apparatus 16, a communication device 20, a human machine interface (HMI) 30, a navigation apparatus 50, a micro-processing unit (MPU) 60, a vehicle sensor 70, a driving operator 80, an automated driving control unit 100, a travel drive force output device 200, a brake device 210, a steering device 220, a steering wheel 300 (a steering member), and an airbag device 400. These apparatuses and devices are connected to each other by a multiplex communication line such as a controller area network (CAN)

communication line, a serial communication line, a wireless communication network, and the like. In FIG. 1, the "steering wheel" is described as a "STR wheel" in an abbreviated manner. Moreover, the components shown in FIG. 1 are examples only, some components may be omitted and other components may be added.

The camera 10 is, for example, a digital camera which uses a solid-state imaging device such as a charge coupled device (CCD) or a complementary metal oxide semiconductor (CMOS). One or a plurality of cameras 10 are attached to arbitrary positions of a vehicle (hereinafter referred to as a host vehicle M) in which the vehicle system 1 is mounted. When capturing images on the front side, the camera 10 is attached to an upper part of a front windshield or a back surface of a rear-view mirror. The camera 10, for example, captures the images around the host vehicle M repeatedly and periodically. The camera 10 may be a stereo camera.

The radar apparatus 12 emits radio waves such as millimeter waves to the surroundings of the host vehicle M and detects radio waves (reflected waves) reflected from an object to detect at least the position (the distance and direction) of the object. One or a plurality of radar apparatuses 12 are attached to arbitrary positions of the host vehicle M. The radar apparatus 12 may detect the position and the speed of an object according to a frequency modulated continuous wave (FM-CW) method.

The finder 14 is a light detection and ranging or laser imaging detection and ranging (LIDAR) device that measures scattering light of emitted light and detects the distance to an object. One or a plurality of finders 14 are attached to arbitrary positions of the host vehicle M.

The object recognition apparatus 16 performs sensor fusion processing on detection results obtained by some or all of the camera 10, the radar apparatus 12, and the finder 14 to recognize the position, the kind, the speed, and the like of an object. The object recognition apparatus 16 outputs the recognition results to the automated driving control unit 100.

The communication device 20, for example, communicates with other vehicles present around the host vehicle M using a cellular network, a Wi-Fi network, Bluetooth (registered trademark), a dedicated short range communication (DSRC), or the like, or communicates with various servers via a wireless base station.

The HMI 30 presents various pieces of information to an occupant of the host vehicle M and receives input operations of the occupant. The HMI 30 includes various display devices, speakers, buzzers, touch panels, switches, keys, and the like.

The navigation apparatus 50 includes, for example, a global navigation satellite system (GNSS) receiver 51, a navigation HMI 52, and a route determining unit 53, and stores first map information 54 in a storage device such as a hard disk drive (HDD) or a flash memory. The GNSS receiver specifies the position of the host vehicle M on the basis of signals received from GNSS satellites. The position of the host vehicle M may be specified or complemented by an inertial navigation system (INS) which uses the output of the vehicle sensor 70. The navigation HMI 52 includes a display device (a navigation display), a speaker, a touch panel, switches, keys, a microphone, and the like. The navigation HMI 52 may be partially or entirely integrated with the HMI 30. For example, the route determining unit 53 determines a route from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like. The route determined by the route determining unit 53 is output to the MPU 60. Moreover, the navigation apparatus 50, for example, may perform route guidance using the navigation HMI 52 on the basis of the route determined by the route determining unit 53. The navigation apparatus 50 may be realized by the functions of a terminal device such as a smartphone or a tablet terminal held by a user. Moreover, the navigation apparatus 50 may transmit a present position and a destination to a navigation server via the communication device 20 and acquire a route returned from the navigation server. Furthermore, the navigation apparatus 50 may collect the voice of an occupant through a microphone of the navigation HMI 52 to recognize the voice and set the route on the basis of the content of the voice.

The MPU 60 functions as a recommended lane determining unit 61, for example, and stores second map information 62 in a storage device such as a HDD or a flash memory. The recommended lane determining unit 61 divides the route provided from the navigation apparatus 50 into a plurality of blocks (for example, the route is divided by 100 [m] in relation to a vehicle traveling direction) and determines a recommended lane for each block by referring to the second map information 62. The recommended lane determining unit 61 determines a certain lane from the left that the host vehicle travels in. When a branching point, a junction point, and the like are present on a route, the recommended lane determining unit 61 determines a recommended lane so that the host vehicle M can travel along a reasonable route for proceeding to a branch destination.

The second map information 62 is map information with higher accuracy than the first map information 54. The second map information 62 includes, for example, information on the center of a lane or information on the boundaries of a lane. Moreover, the second map information 62 may include road information, traffic regulation information, address information (address and postal codes), facility information, telephone number information, and the like. The road information includes information indicating the type of a road such as an expressway, a toll road, a national highway, or a county or state road, and information such as the number of lanes on a road, the width of each lane, a gradient of a road, the position of a road (3-dimensional coordinates including the latitude, the longitude, and the height), the curvature of a lane, and the positions of merging and branching points of lanes, and signs provided on a road. The second map information 62 may be updated as necessary by accessing other devices using the communication device 20.

The vehicle sensor 70 includes a vehicle speed sensor that detects the speed of the host vehicle M, an acceleration sensor that detects acceleration, a yaw-rate sensor that detects an angular speed about a vertical axis, an azimuth sensor that detects the direction of the host vehicle M, and the like.

The driving operator 80 includes, for example, an acceleration pedal, a brake pedal, a shift lever, and other operators. The steering wheel 300 may be included in the driving operator 80. Sensors that detect an amount of operation, the presence of an operation, and the like are attached to the driving operator 80, and the detection results are output to any one or both of the automated driving control unit 100 or the travel drive force output device 200, the brake device 210, and the steering device 220.

The automated driving control unit 100 includes, for example, a first control unit 120 and a second control unit 140. These functional units each are realized when a processor such as a central processing unit (CPU) or the like executes a program (software). Moreover, some or all of these functional units may be realized by hardware such as large scale integration (LSI), an application specific integrated circuit (ASIC), or a field-programmable gate array (FPGA) and may be realized by the cooperation of software and hardware.

The first control unit 120 includes, for example, an outside recognition unit 121, a host vehicle position recognition unit 122, an action plan generation unit 123, an automated driving mode control unit 124, and a switching control unit 125.

The outside recognition unit 121 recognizes states of a nearby vehicle such as the position, speed and acceleration thereof on the basis of information input directly from the camera 10, the radar apparatus 12, and the finder 14 or via the object recognition apparatus 16. The position of the neighboring vehicle may be represented by a representative point such as the center of gravity or a corner of the neighboring vehicle and may be represented by a region represented by the contour of the neighboring vehicle. The "state" of the neighboring vehicle may include the acceleration or a jerk of the neighboring vehicle or an "action state" (for example, whether the neighboring vehicle has changed or is trying to change lanes). Moreover, the outside recognition unit 121 may recognize the position of a guard rail, a post, a parked vehicle, a pedestrian, and other objects in addition to the neighboring vehicle.

The host vehicle position recognition unit 122, for example, recognizes a lane (a traveling lane) in which the host vehicle M is traveling and the relative position and the direction of the host vehicle M in relation to the traveling lane. For example, the host vehicle position recognition unit 122 recognizes the traveling lane by comparing a pattern (for example, an arrangement of solid lines and broken lines) of lane marks obtained from the second map information 62 and a pattern of lane marks around the host vehicle M recognized from the images captured by the camera 10. In the recognition, the position of the host vehicle M acquired from the navigation apparatus 50 and the processing results of the INS may also be taken into consideration.

Figure 2:
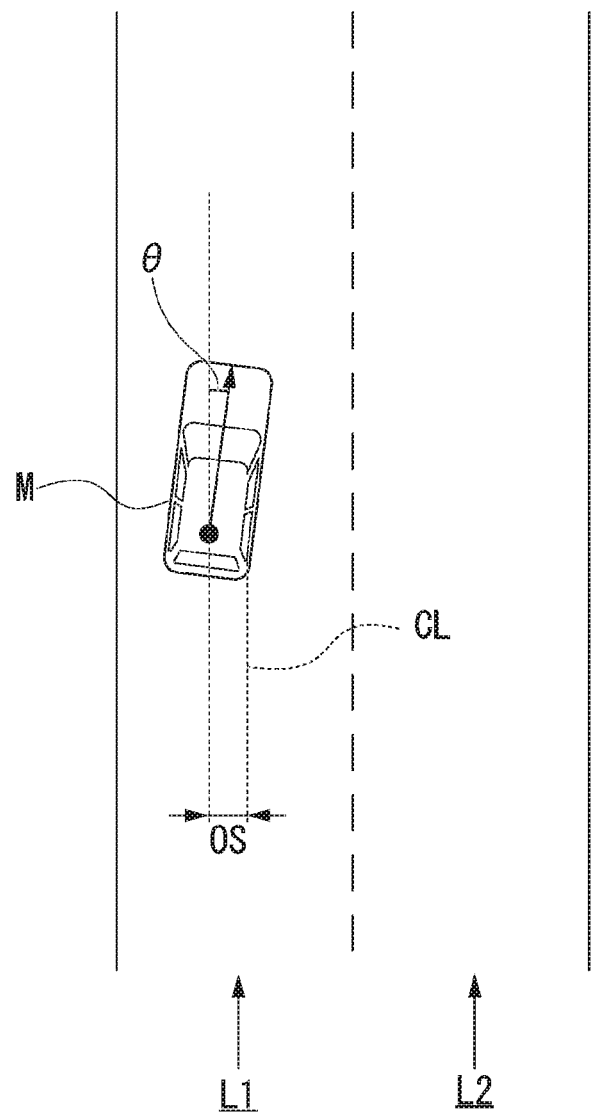
FIG. 2 is a diagram showing how a relative position and a direction of a host vehicle M with respect to a traveling lane L1 are recognized by a host vehicle position recognition unit 122.

The host vehicle position recognition unit 122, for example, recognizes the position and the direction of the host vehicle M in relation to the traveling lane. FIG. 2 is a diagram showing how the relative position and the direction of the host vehicle M in relation to the traveling lane L1 are recognized by the host vehicle position recognition unit 122. For example, the host vehicle position recognition unit 122 recognizes an offset OS from a traveling lane center CL of a reference point (for example, the center of gravity) of the host vehicle M and an angle θ between the traveling direction of the host vehicle M and an extension line of the traveling lane center CL as the relative position and the direction of the host vehicle M in relation to the traveling lane L1. Instead of this, the host vehicle position recognition unit 122 may recognize the position or the like of a reference point of the host vehicle M in relation to any one of side ends of the host lane L1 as the relative position of the host vehicle M in relation to the traveling lane. The relative position of the host vehicle M recognized by the host vehicle position recognition unit 122 is provided to the recommended lane determining unit 61 and the action plan generation unit 123.

The action plan generation unit 123 determines events executed sequentially in automated driving so that the host vehicle travels along the recommended lane determined by the recommended lane determining unit 61 and can cope with the surrounding situation of the host vehicle M. Examples of the event include a constant speed travel event in which a vehicle travels in the same traveling lane at a constant speed, a trailing travel event in which a vehicle follows a preceding vehicle, a lane changing event, a merging event, a diverging event, an emergency stop event, and a handover event for ending automated driving and switching to manual driving. Moreover, during execution of these events, an avoidance action may be planned on the basis of a surrounding situation (the presence of a neighboring vehicle or a pedestrian or narrowing of lanes due to road construction) of the host vehicle M.

The action plan generation unit 123 generates a target trajectory along which the host vehicle M travels in the future. The target trajectory includes, for example, a speed element. For example, the target trajectory is generated as a set of target positions (trajectory points) that are to be reached at a plurality of future reference time points which are set at intervals of predetermined sampling periods (for example, approximately 0.x [sec]). Therefore, when the width between trajectory points is large, it indicates that a vehicle travels at high speed in a segment between the trajectory points.

Figure 3:
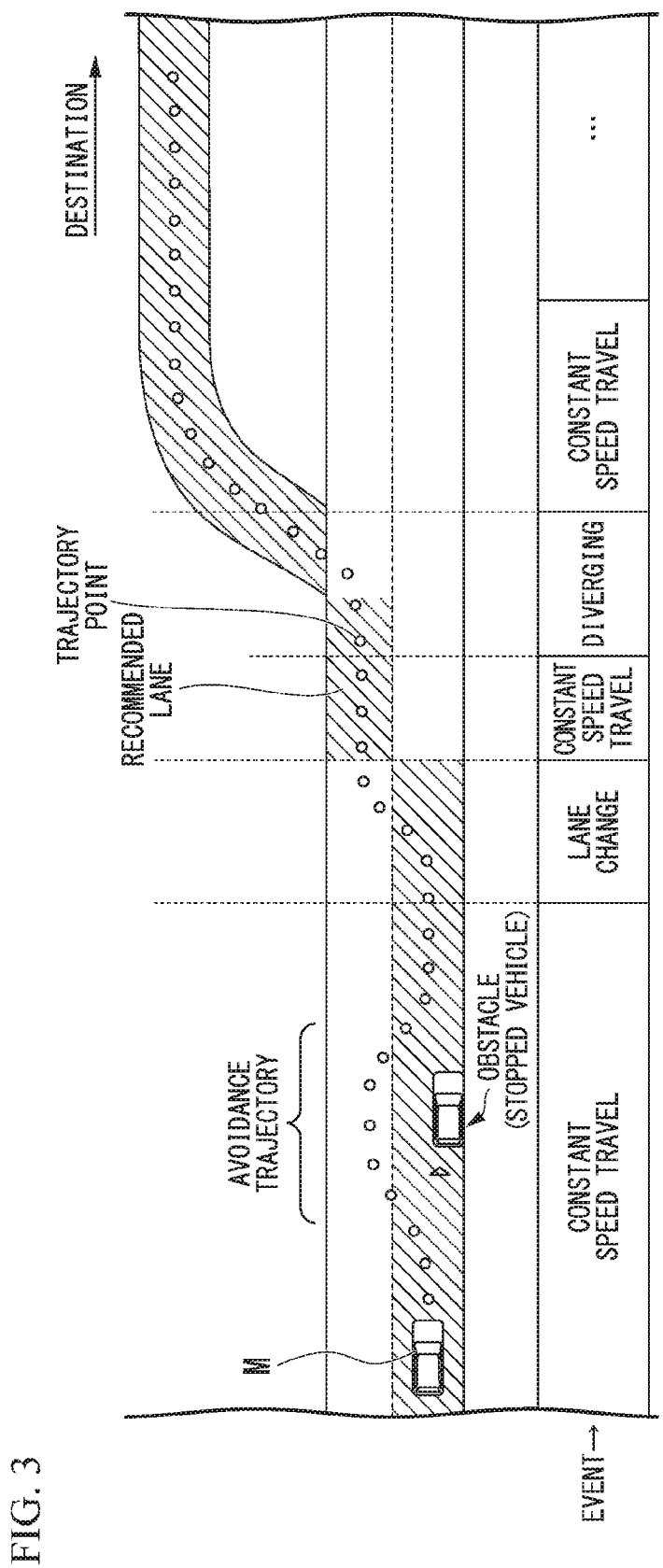
FIG. 3 is a diagram showing how a target trajectory is generated on the basis of a recommended lane.

FIG. 3 is a diagram showing how a target trajectory is generated on the basis of a recommended lane. As shown in the drawing, the recommended lane is set to be convenient for traveling along the route to the destination. When a vehicle arrives at a position a predetermined distance before (which may be determined depending on an event type) of a switching position of the recommended lane, the action plan generation unit 123 activates a lane changing event, a diverging event, a merging event, or the like. When a need to avoid an obstacle occurs during execution of each event, an avoidance trajectory is generated as shown in the drawing.

The action plan generation unit 123, for example, generates a plurality of candidates for traveling trajectories and selects an optimal target trajectory at that time point on the basis of the viewpoint of safety and efficiency.

The automated driving mode control unit 124 controls at least one of acceleration/deceleration and steering of the host vehicle M automatically so that the host vehicle M travels along the route to a destination. Moreover, the automated driving mode control unit 124 performs automated driving control in any one of a plurality of modes in which the degrees of driving assistance are different. The degree of driving assistance is one or both of the level of obligation (hereinafter also referred to simply as "obligation related to driving") related to vehicle driving required for vehicle occupants of the host vehicle M and the level of allowability of operations on respective interface devices of the HMI 30 that receives operations of a vehicle occupant and outputs information.

The automated driving mode control unit 124 determines a mode of automated driving performed by the first control unit 120 on the basis of an operation of an occupant on the HMI 30, a travel mode determined by an event determined by the action plan generation unit 123, and the like. The determined automated driving mode is notified to the steering wheel control unit 330 to be described later. In the present embodiment, the automated driving mode includes the following modes. The following modes are examples only, and the number of automated driving modes and the content thereof may be determined arbitrarily.

[First Mode]

A first mode is a mode in which the degree of driving assistance is the highest among the modes. When the first mode is performed, since all vehicle control operations such as complex merging control are performed automatically, no obligations related to driving as required for vehicle occupants are incurred. For example, a vehicle occupant does not need to monitor the surroundings and the state of the host vehicle M (no surrounding monitoring obligations as required for vehicle occupants are incurred). Moreover, a vehicle occupant does not need to perform driving-related operations on an acceleration pedal, a brake pedal, a steering wheel, and the like (no driving operation obligation as required for vehicle occupants are incurred), and may concentrate on something other than vehicle driving.

Here, an example of the first mode is a congestion following mode (a low-speed following mode) in which a vehicle follows a preceding vehicle in the event of congestion. In the first mode, for example, safe automated driving can be realized by a vehicle following a preceding vehicle on a congested expressway similarly to traffic jam pilot (TJP), and the TJP ends when congestion is eliminated. As for the elimination of congestion, for example, it can be determined that congestion is eliminated when a traveling speed of the host vehicle M reaches a predetermined speed or higher (for example, 40 km/h or higher). However, for example, there is no limitation thereto, and the elimination of congestion may be detected by the communication device 20 receiving traffic information (congestion information) from an external apparatus. Although the first mode may switch to another mode when TJP ends, the mode may be switched when a predetermined period has elapsed after TJP ends or when the traveling speed reaches a speed faster than the speed at which the TJP ends.

[Second Mode]

A second mode is a mode in which the degree of driving assistance is the next highest after the first mode. When the second mode is performed, although all vehicle control operations are basically performed automatically, a vehicle occupant may be responsible for operation of the driving of the host vehicle M depending on a scene (the obligations related to vehicle driving are increased as compared to the first mode). Due to this, a vehicle occupant needs to monitor the surroundings and the state of the host vehicle M and pay attention to vehicle driving (the obligations related to vehicle driving are increased as compared to the first mode).

[Third Mode]

A third mode is a mode in which the degree of driving assistance is the next highest after the second mode. When the third mode is performed, a vehicle occupant needs to check the HMI 30 depending on a scene (the obligations related to vehicle driving are increased as compared to the second mode). In the third mode, when a lane changing timing is notified to a vehicle occupant, and the vehicle occupant performs a lane changing operation on the HMI 30, a lane changing operation is performed automatically. Due to this, the vehicle occupant needs to monitor the surroundings and the state of the host vehicle M (the obligations related to vehicle driving are increased as compared to the second mode).

A driving mode may include a manual driving mode. When a manual driving mode is included as one of automated driving modes, the manual driving mode is a mode in which the degree of driving assistance is the next highest after the third mode (that is, a mode in which the degree of driving assistance is the lowest).

In any one of the automated driving modes, it is possible to switch to (override) the manual driving by operating the driving operator 80. Override starts, for example, when an operation on the driving operator 80 by a vehicle occupant of the host vehicle M is continued for a predetermined period or longer, when a predetermined operation change amount (for example, a throttle opening degree of an acceleration pedal, a depression amount of a brake pedal, or a steering angle of a steering wheel body 301) or higher is detected, or when a predetermined number of operations or larger are performed on the driving operator 80.

The switching control unit 125 switches between the automated driving mode and the manual driving mode on the basis of a signal input from the HMI 30. Moreover, the switching control unit 125 switches from the automated driving mode to the manual driving mode on the basis of an operation of inputting acceleration/deceleration or steering to the driving operator 80. For example, the switching control unit 125 switches (overrides) from the automated driving mode to the manual driving mode when a state in which an operation amount indicated by a signal input from the driving operator 80 exceeds a threshold is continued a reference period or longer. The switching control unit 125 may return to the automated driving mode when an operation on the driving operator 80 is not detected in a predetermined period after the driving mode is switched to the manual driving mode by override.

The second control unit 140 includes a travel control unit 141. The travel control unit 141 controls the travel drive force output device 200, the brake device 210, and the steering device 220 such that the host vehicle M passes along the target trajectory generated by the action plan generation unit 123 at scheduled times.

The travel drive force output device 200 outputs a travel drive force (torque) for a vehicle to travel to driving wheels. The travel drive force output device 200 includes a combination of an internal combustion engine, an electric motor, and a transmission and an ECU that controls these components. The ECU controls the above-mentioned components according to information input from the travel control unit 141 or information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to information input from the travel control unit 141 or information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration but may be an electrically-controlled hydraulic-pressure brake device that controls an actuator according to information input from the travel control unit 141 and delivers hydraulic pressure of the master cylinder to a cylinder.

The steering device 220 includes, for example, a steering ECU and an electric motor. The electric motor, for example, applies a force to a rack-and-pinion mechanism to change the direction of a steering wheel. The steering ECU drives an electric motor according to the information input from the travel control unit 141 or the information input from the steering wheel body 301 to change the direction of the steering wheel.

The steering wheel 300 includes the steering wheel body 301, a table 310, a drive device 320, and a steering wheel control unit 330 (an inclination control unit).

Figure 4:
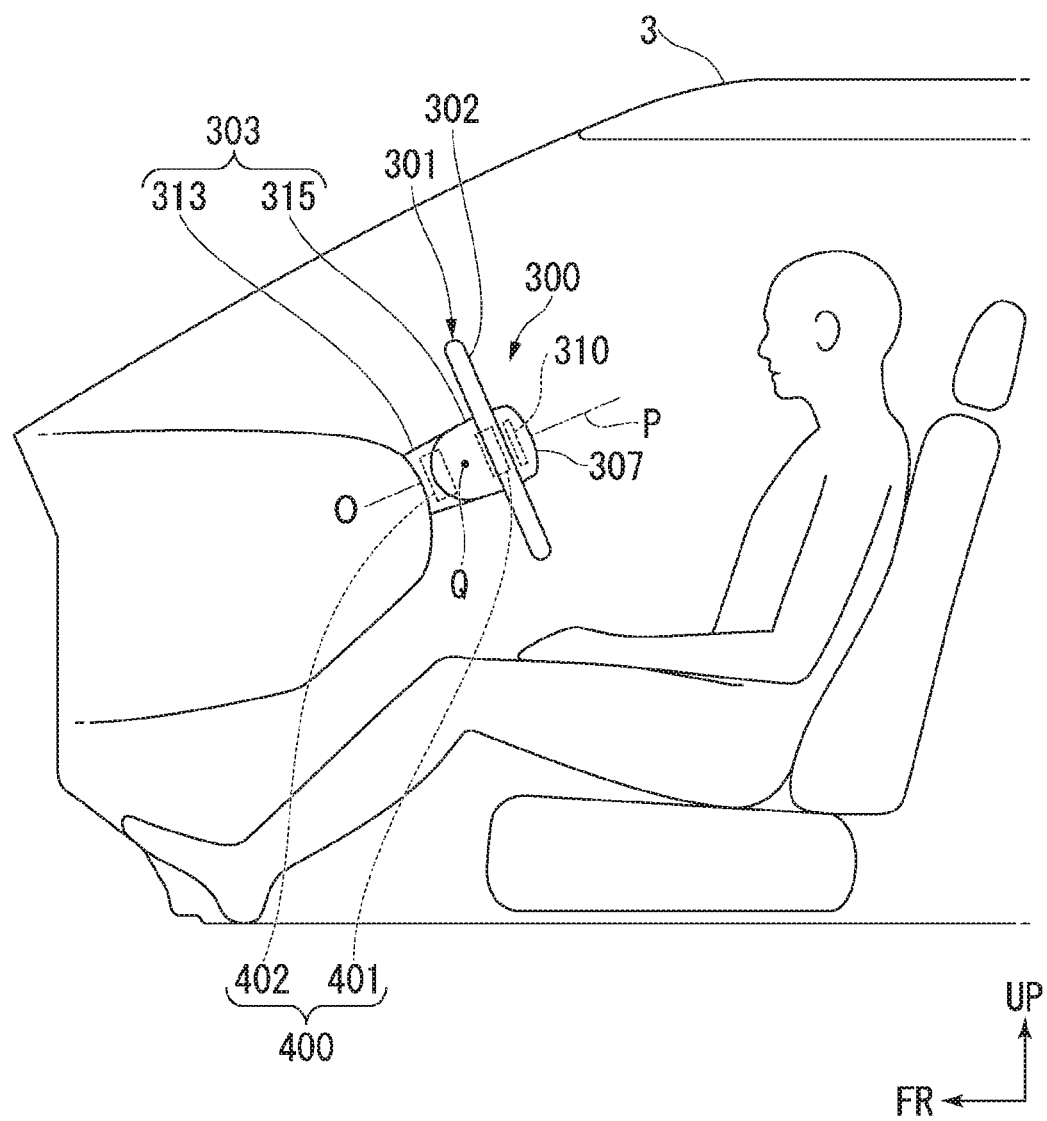
FIG. 4 is a cross-sectional view of a vehicle according to a first embodiment.

FIG. 4 is a cross-sectional view of a vehicle according to the first embodiment. In the drawing, arrow UP indicates the upper side of a vehicle and arrow FR indicates the front side of a vehicle.

As shown in FIG. 4, the steering wheel body 301 is coupled to a steering shaft and is provided so as to be rotatable about a rotation axis O orthogonal to a vehicle width direction. The rotation axis O is slightly inclined with respect to a vehicle front-rear direction so as to be directed to the vehicle upper side as it advances from the front side toward the rear side. In the following description, a driver (an occupant) side of the steering wheel body 301 will be referred to as a front side and the opposite side will be referred to as a back side. Moreover, in the description of the configuration of the steering wheel body 301, it is assumed that the steering wheel body 301 is in a neutral state (that is, a straight advancing state of steering) during a manual driving mode.

Figure 5:
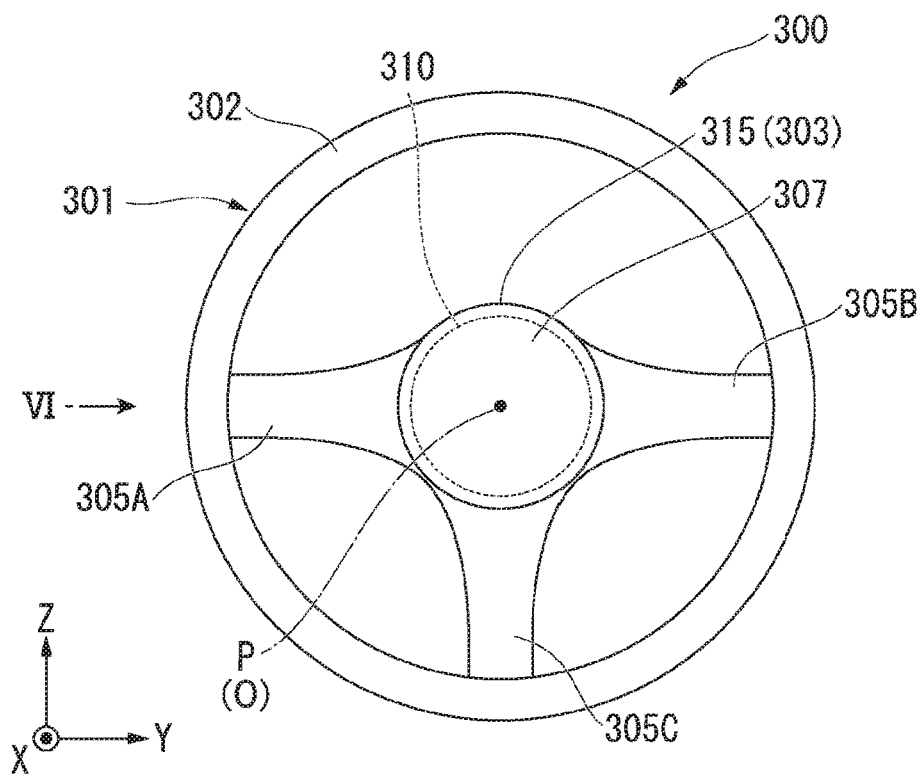
FIG. 5 is a front view of a steering wheel body 301 according to the first embodiment.

FIG. 5 is a front view of the steering wheel body 301 according to the first embodiment. In the drawing, an X-direction is identical to an axial direction (the front side is a positive X-direction) of a central axis P to be described later, a Y-direction is identical to a vehicle width direction (a vehicle right side is a positive Y-direction), and a Z-direction is identical to a direction (the upper side is a positive Z-direction) orthogonal to the XY-direction.

As shown in FIG. 5, the steering wheel body 301 includes a rim portion 302 formed in an annular form, a hub portion 303 provided on the inner side of the rim portion 302 and coupled with the steering shaft (not shown), and a plurality of (three in the present embodiment) spoke parts 305A to 305C that connect the rim portion 302 and the hub portion 303. The rim portion 302, the hub portion 303, and the spoke parts 305A to 305C rotate integrally about the rotation axis O in relation to the vehicle body.

The rim portion 302 is grasped by a driver during steering. The rim portion 302 is formed in a ring form in a front view thereof. A central axis P of the rim portion 302 is coaxial with the rotation axis O.

Figure 6:
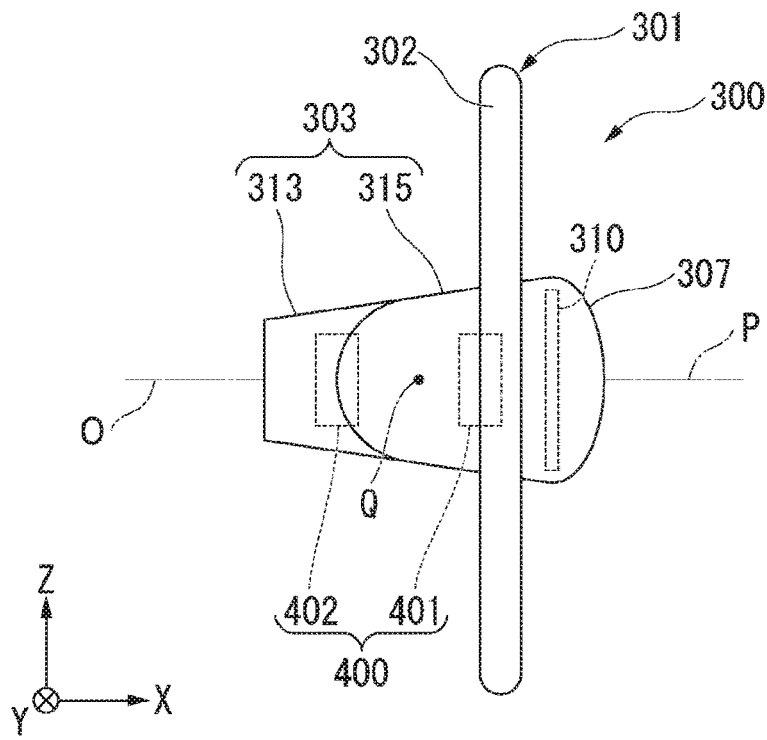
FIG. 6 is a perspective view along arrow VI in FIG. 5.

FIG. 6 is a perspective view along arrow VI in FIG. 5.

As shown in FIGS. 5 to 6, the hub portion 303 is formed in a circular form in a front view thereof and extends along an axial direction of the central axis P. A front-side end (a front end 307 (a receiving part)) of the hub portion 303 protrudes toward the front side further than the rim portion 302 in the axial direction of the central axis P. A horn switch that functions as a switch for blowing a horn is provided in a portion of the front end 307 facing the front side. Moreover, switches of the HMI 30 and the navigation HMI 52 (see FIG. 1) may be provided in the portion of the front end 307 facing the front side.

Figure 7:
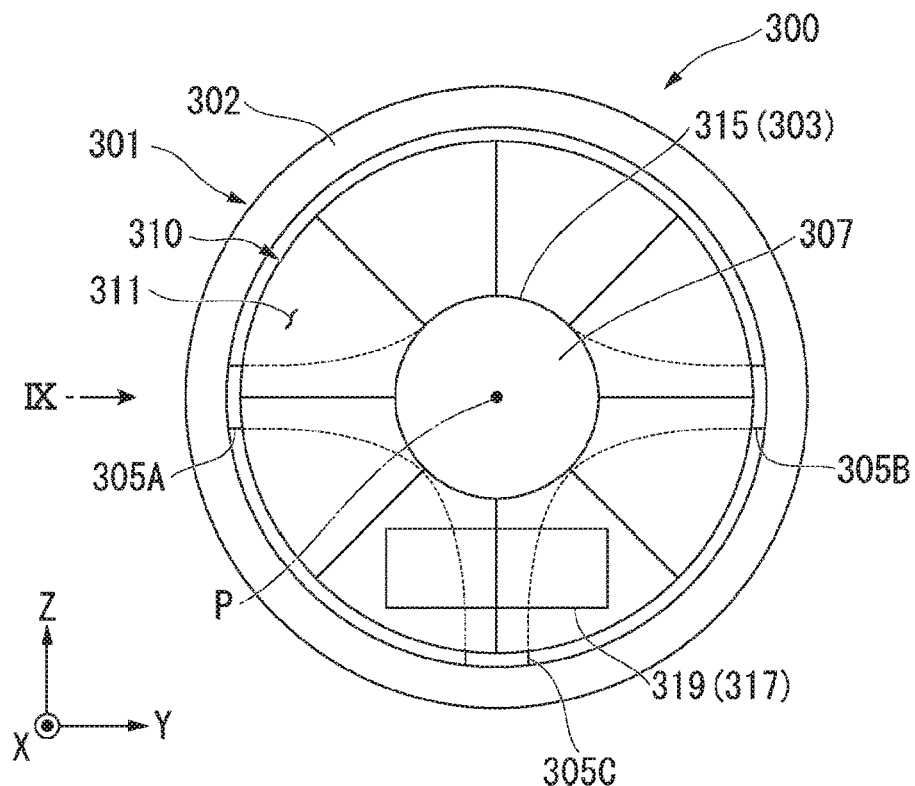
FIG. 7 is a front view of the steering wheel body 301 according to the first embodiment.
Figure 8:
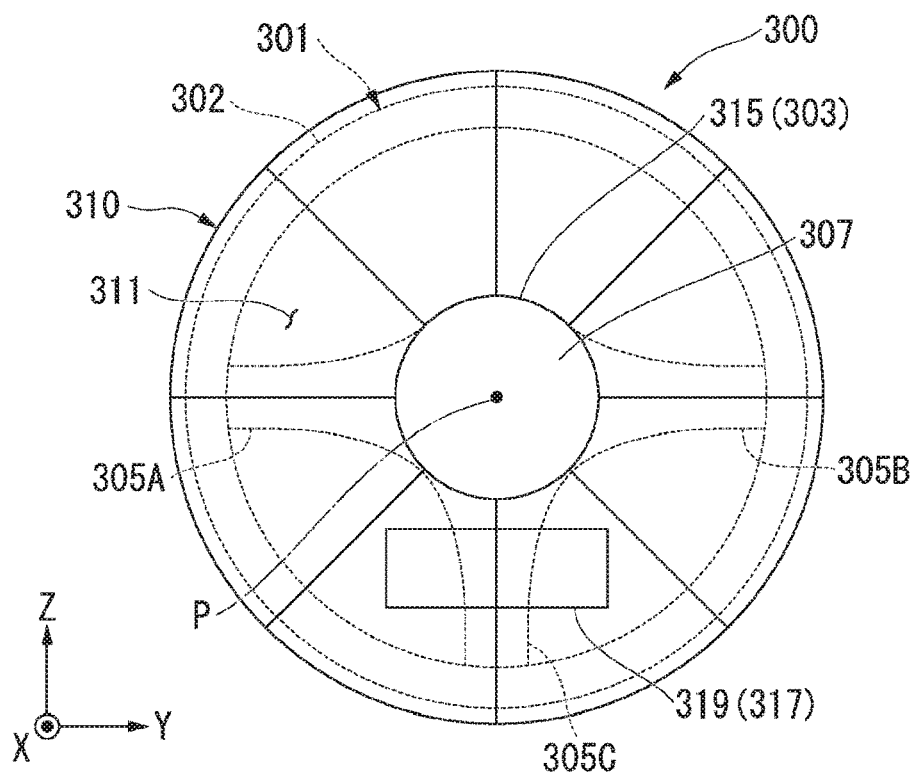
FIG. 8 is a front view of the steering wheel body 301 according to the first embodiment.
Figure 9:
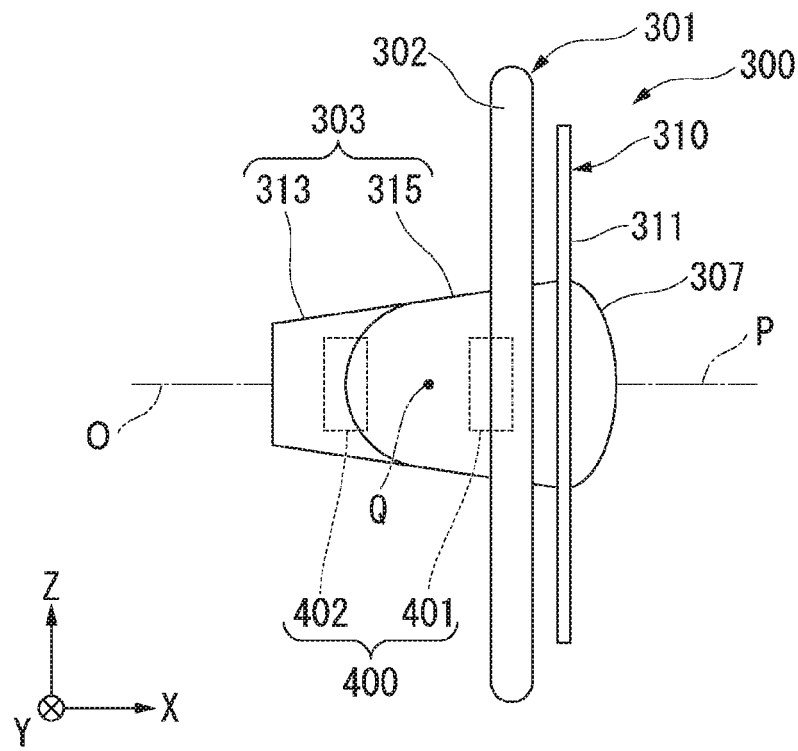
FIG. 9 is a perspective view along arrow IX in FIG. 7.

FIGS. 7 and 8 are front views of the steering wheel body 301 according to the first embodiment. FIG. 9 is a perspective view along arrow IX in FIG. 7.

As shown in FIGS. 7 to 9, the table 310 is provided so as to be receivable inside the front end 307 of the hub portion 303. The table 310 deploys from a state of being received inside the front end 307 of the hub portion 303 to thereby form a table surface 311 at least on an inner circumferential side of the rim portion 302. The table surface 311 is formed in a planar form following a direction orthogonal to the central axis P. The table 310 is deployed in a circular form in a front view thereof and is disposed at a predetermined interval in the axial direction of the central axis P with respect to the rim portion 302. The predetermined interval is, for example, an interval in which a driver can place his/her fingers between the table 310 and the rim portion 302. In this way, the table 310 is deployed in a state in which a driver can perform a steering operation (an operation of rotating the rim portion 302).

As shown in FIG. 7, the table 310 is formed by a plurality of fan-shaped members rotatably connected to each other. In this case, the table 310 spreads and deploys so that the respective fan-shaped members form a circular form when seen from an axial direction of the central axis P in a way that the plurality of fan-shaped members are arranged in a circumferential direction about the central axis P in a state in which a circular arc portion at an outer circumferential edge thereof faces the opposite side of the central axis P. Moreover, the table 310 is reduced in diameter when seen from the axial direction of the central axis P so as to be received inside the front end 307 of the hub portion 303 in a way that the respective fan-shaped members are displaced so as to overlap each other (see FIG. 5).

The table 310 can be deployed, for example, in two steps including a small deployment state (a state shown in FIG. 7) in which the table 310 is deployed so as to be received more inward than the inner circumferential edge of the rim portion 302 in a plan view when seen from the axial direction of the central axis P and a large deployment state (a state shown in FIG. 8) in which the table 310 is deployed so as to cover the rim portion 302 when seen from the axial direction of the central axis P and the area of the table surface 311 is larger than that in the small deployment state. The table 310 is deployed so that in the small deployment state, a hand (fingers) can be inserted along the axial direction of the central axis P between the table 310 and the inner circumferential edge of the rim portion 302 so that a driver can perform a steering operation.

As shown in FIGS. 7 and 8, a touch panel 317 consisting of a display device and a touch sensor is provided on the table surface 311 of the table 310. The touch panel 317 can be used as, for example, a keyboard 319. That is, the keyboard 319 consisting of a touch sensor of the touch panel 317 is disposed on the table surface 311 of the table 310. The keyboard 319 may constitute the navigation HMI 52 (see FIG. 1) of the navigation apparatus 50 described above. In this case, the navigation apparatus 50 may process the information input by the keyboard 319 with priority over the information input through the microphone of the navigation HMI 52. Moreover, the touch panel 317 may display an image displayed by the display device of the navigation HMI 52 of the navigation apparatus 50 or a display device inside the vehicle such as a center display.

The drive device 320 performs an operation of deploying and receiving the table 310. That is, the drive device 320 can deploy the table 310 stored inside the front end 307 of the hub portion 303 from the front end 307 of the hub portion 303. Moreover, the drive device 320 can receive the deployed table 310 in the front end 307 of the hub portion 303. The drive device 320 is, for example, a motor or the like and is disposed inside the hub portion 303. The drive device 320 is controlled by the steering wheel control unit 330 (see FIG. 1). Moreover, the drive device 320 may be able to change the position of the table 310 in the axial direction of the central axis P.

Figure 10:
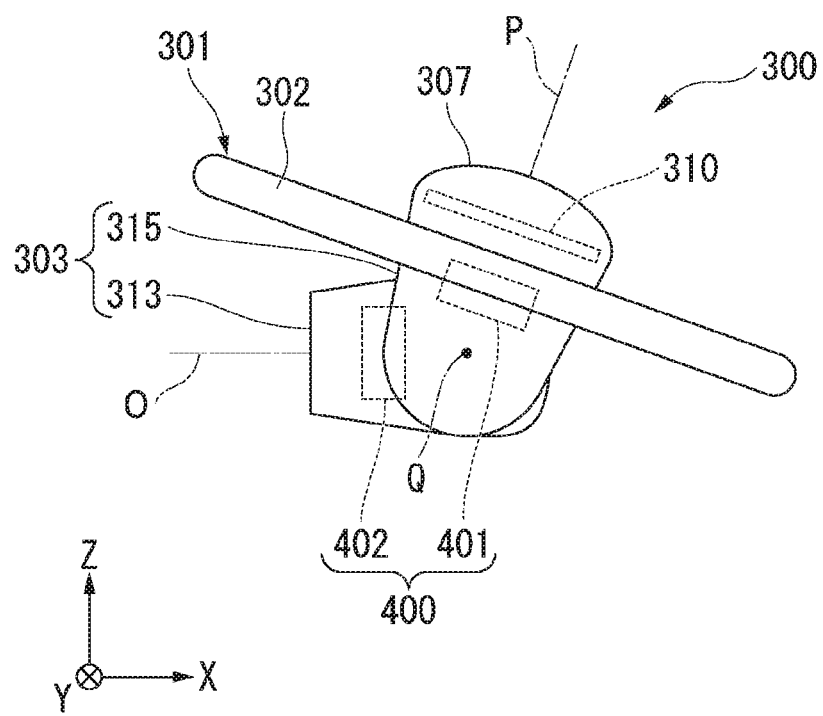
FIG. 10 is an explanatory diagram of the steering wheel body 301 according to the first embodiment and is a side view corresponding to the perspective view along arrow VI in FIG. 5.

FIG. 10 is a side view corresponding to the perspective view along arrow VI in FIG. 5.

As shown in FIGS. 6 and 10, the hub portion 303 is bendably formed in a middle portion in the vehicle front-rear direction. Specifically, the hub portion 303 includes a base portion 313 (a second member) connected to the steering shaft (not shown) and a rotating portion 315 (a first member or a member) including the front end 307 provided to be rotatable about the base portion 313. The base portion 313 supports the rotating portion 315 so as to be rotatable (displaced). The rotating portion 315 is connected to the base portion 313 so as to be rotatable about a rotary axis Q extending in the vehicle width direction. The plurality of spoke parts 305A to 305C (see FIG. 1) are connected to the rotating portion 315. Due to this, the rotating portion 315 of the hub portion 303, the spoke parts 305A to 305C, and the rim portion 302 can be rotated (displaced) integrally about the rotary axis Q in relation to the base portion 313.

The rotating portion 315 rotates in relation to the base portion 313 with the aid of a hub driving source such as a motor (not shown). A rotating operation of the rotating portion 315 is controlled by the steering wheel control unit 330 (see FIG. 1). When the rotating portion 315 rotates in relation to the base portion 313, the connection between the base portion 313 and the steering shaft (not shown) is released so that the steering wheel body 301 is in the neutral state. In this way, the rotating portion 315 is formed so as to be able to change the inclination angle of the central axis P together with the rim portion 302. That is, the inclination angle of the central axis P is an angle about the rotary axis Q and is an inclination angle of the central axis P with respect to the central axis P in a state (the first state) in which the automated driving control unit 100 executes a manual driving mode. The inclination angle of the central axis P can be detected by an inclination angle sensor or the like (not shown).

A state in which the inclination angle of the central axis P in a rotation range of the rotating portion 315 is the smallest is a state in which the central axis P is identical to the rotation axis O (a state shown in FIG. 6). A state in which the inclination angle of the central axis P in a rotation range of the rotating portion 315 is the largest is a state in which the central axis P is identical to a vehicle up-down direction (a state shown in FIG. 10). The rotating portion 315 is formed so that the rotating portion 315 rotates from the state in which the inclination angle of the central axis P is the smallest whereby the front-side end surface of the base portion 313 is exposed toward the front side. In the following description, a state in which the central axis P is identical to the rotation axis O will be referred to as a smallest inclination state and a state in which the central axis P extends in the vehicle up-down direction will be referred to as a largest inclination state. Moreover, a state in which the inclination angle of the central axis P is larger than the inclination angle in the smallest inclination state and the inclination angle of the central axis P is smaller than the inclination angle in the largest inclination state will be referred to as an intermediate state.

The steering wheel control unit 330 controls the inclination angle of the central axis P and the area of the table surface 311 (see FIG. 7) of the table 310 according to a driving assistance state (that is, information on an automated driving mode notified from the automated driving mode control unit 124). The steering wheel control unit 330 controls the inclination angle of the central axis P by controlling the hub driving source described above to rotate the rotating portion 315. Moreover, the steering wheel control unit 330 changes the area of the table surface 311 of the table 310 by controlling the drive device 320 to deform the table 310.

Here, a control state of the steering wheel control unit 330 in each automated driving mode will be described with reference to FIG. 4 and FIGS. 11 to 14.

The steering wheel control unit 330 controls the inclination angle of the central axis P and changes the area of the table surface 311 according to the state of driving assistance being executed by the host vehicle M. Furthermore, the steering wheel control unit 330 controls the inclination angle of the central axis P so that the central axis P approaches the vehicle up-down direction and increases the area of the table surface 311 when the degree of driving assistance being executed by the host vehicle M increases.

Figure 11:
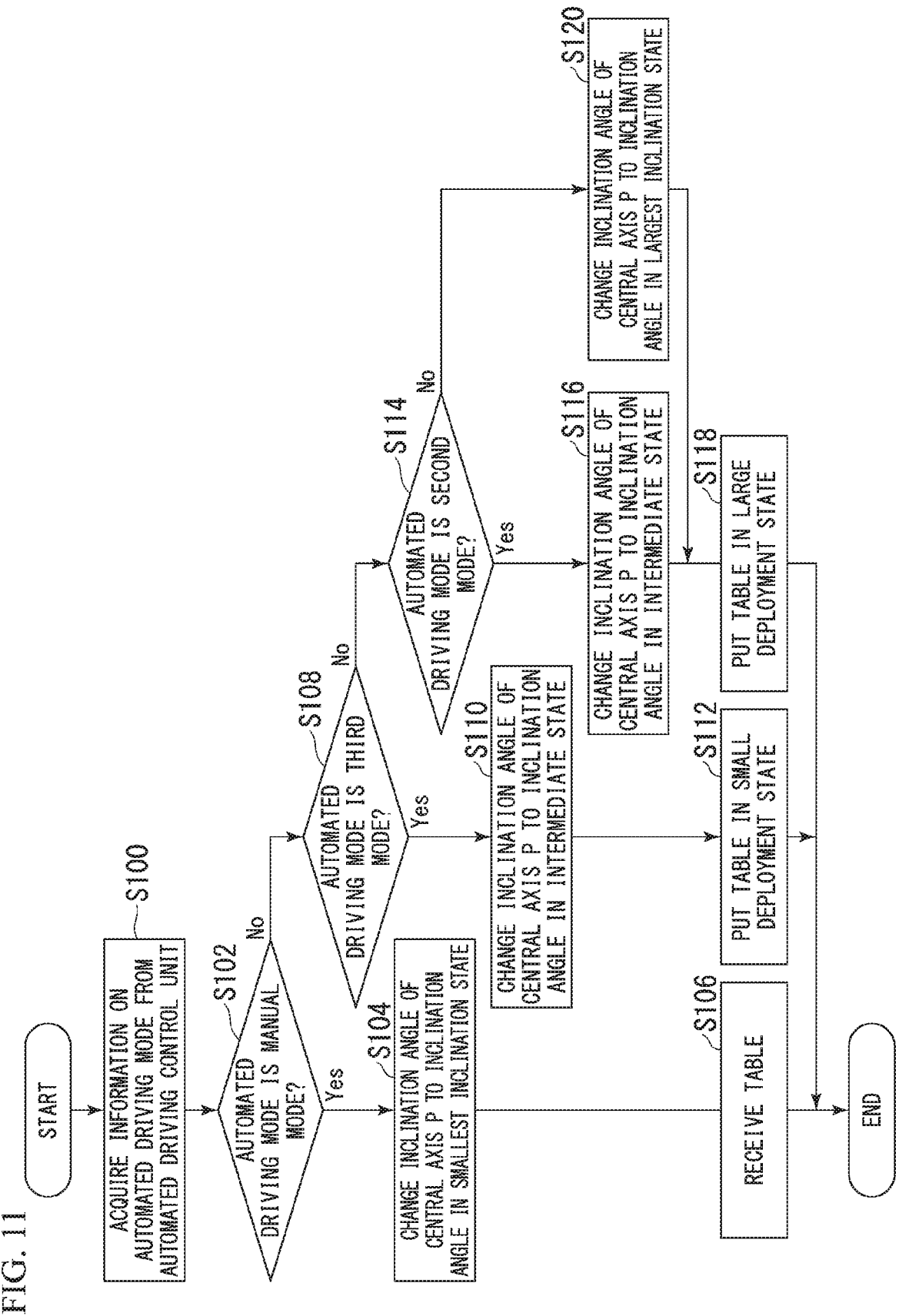
FIG. 11 is a flowchart showing the flow of processes of a steering wheel control unit 330 according to the first embodiment.
Figure 12:
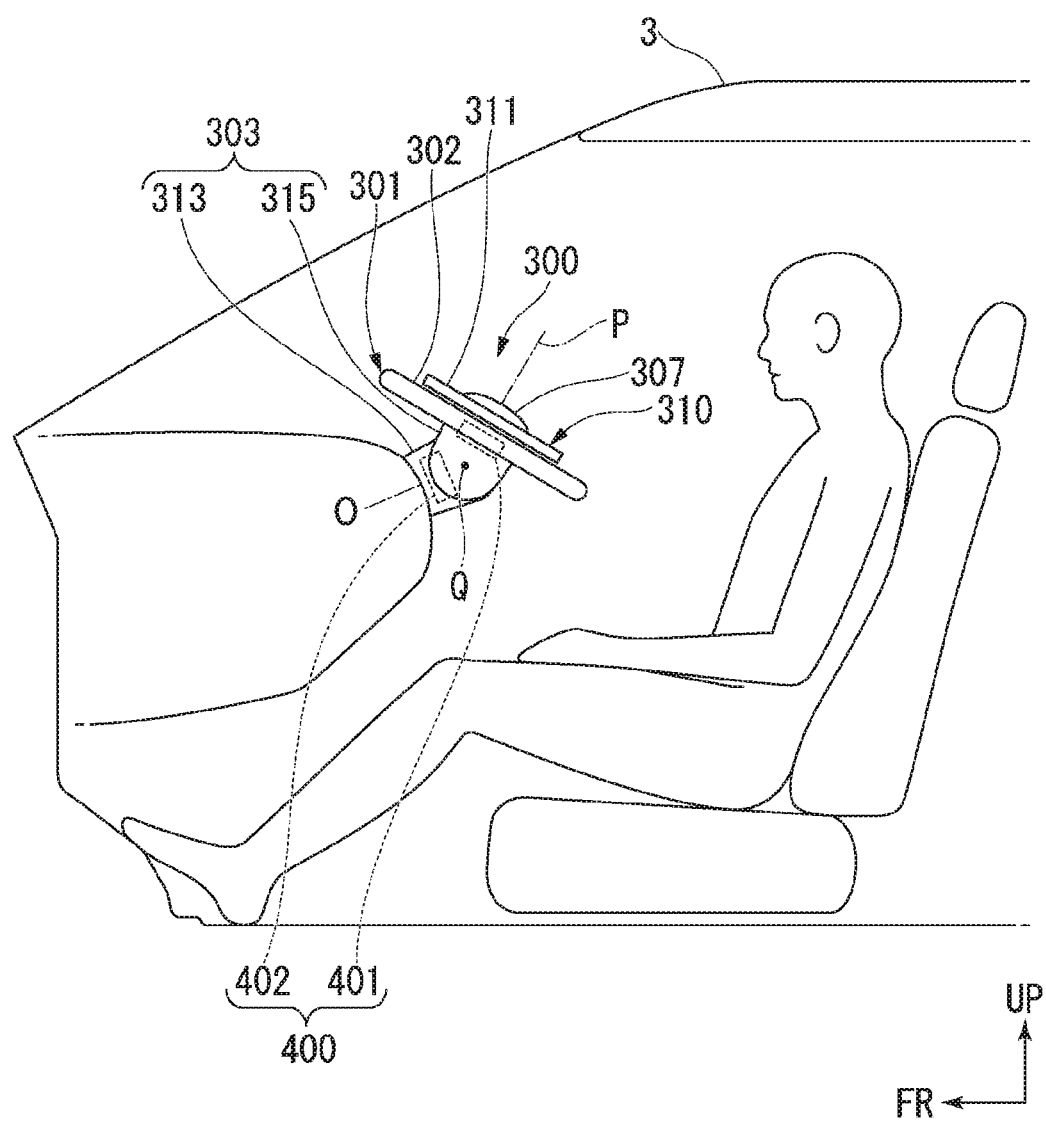
FIG. 12 is a cross-sectional view of a vehicle according to the first embodiment.
Figure 13:
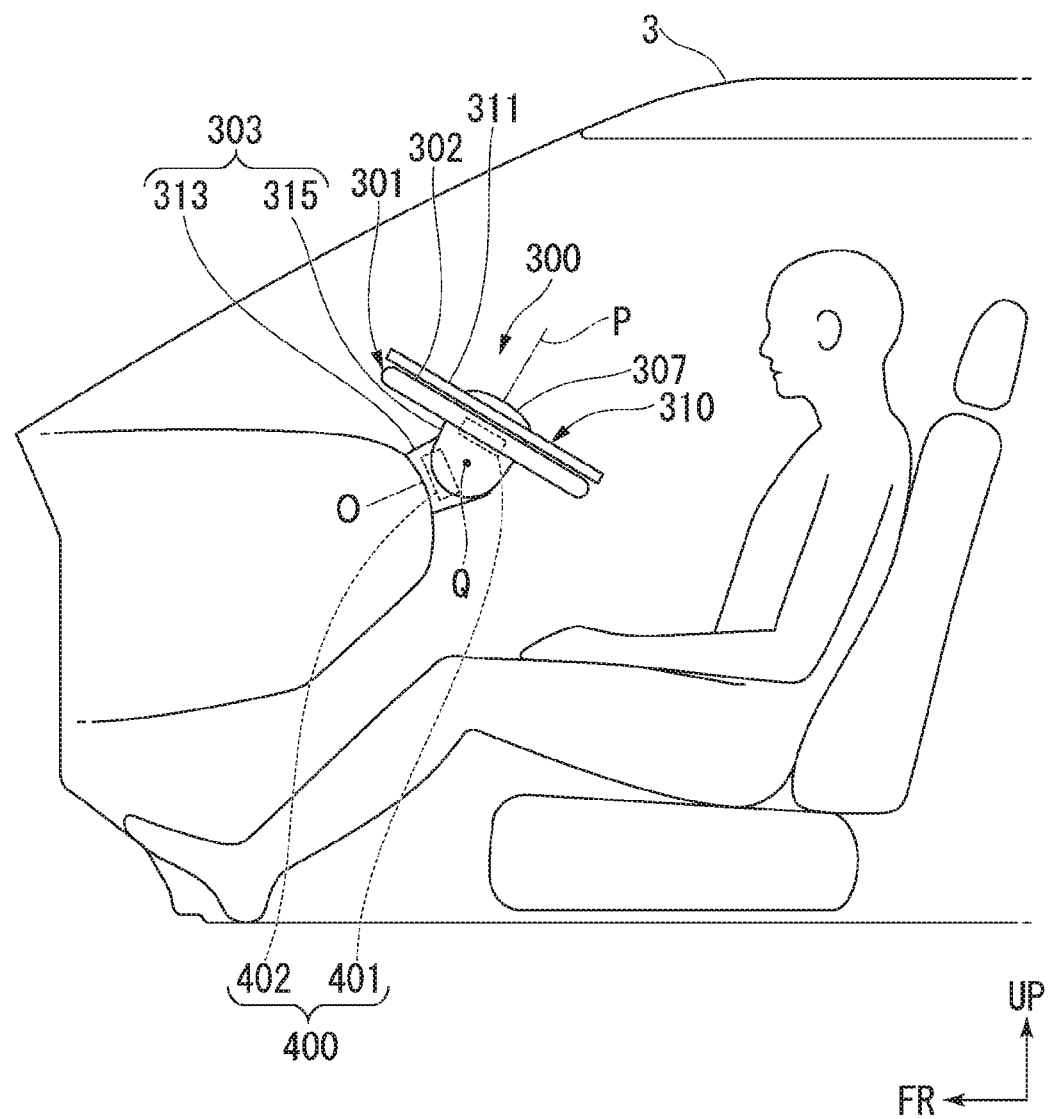
FIG. 13 is a cross-sectional view of a vehicle according to the first embodiment.
Figure 14:
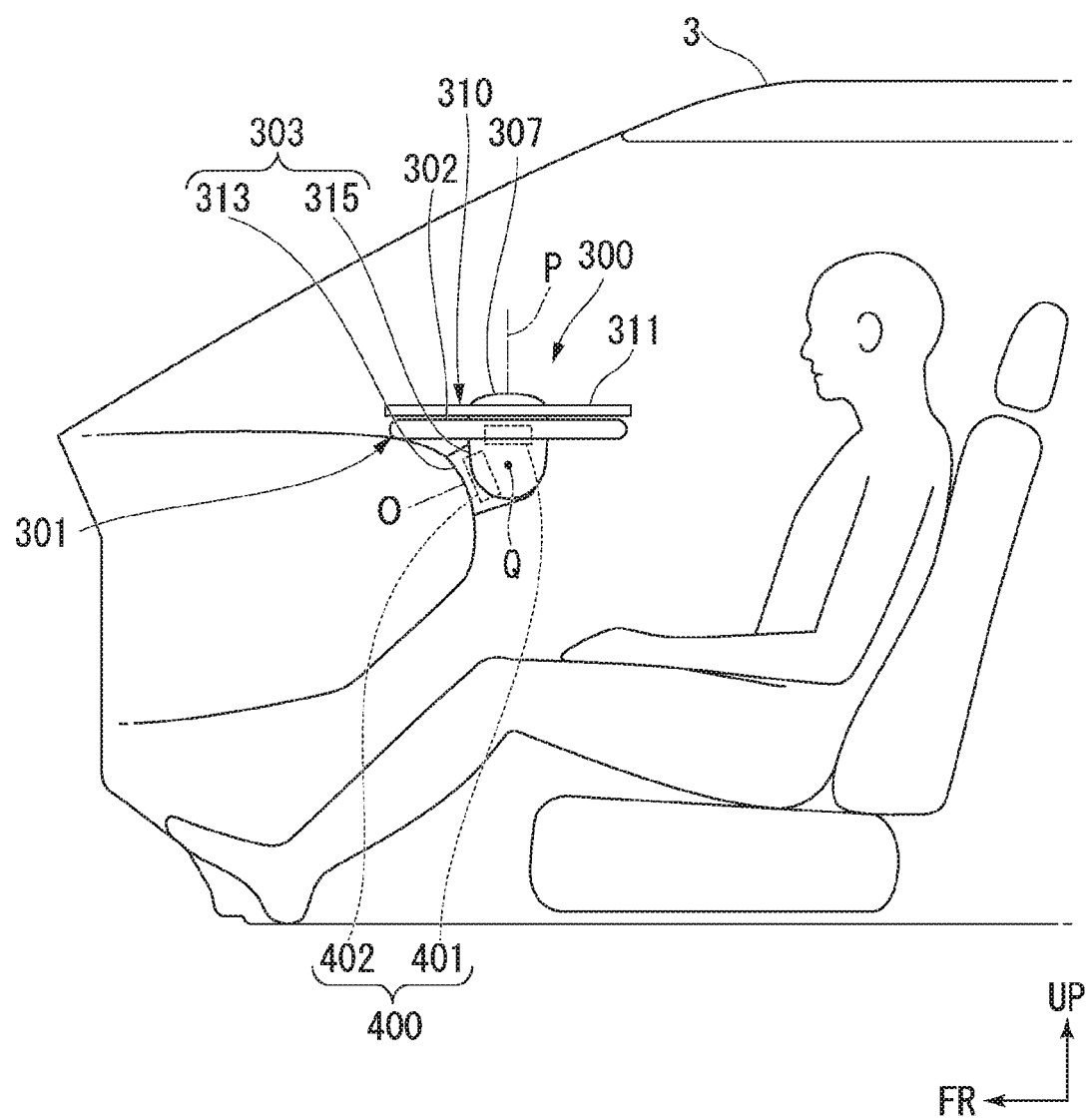
FIG. 14 is a cross-sectional view of a vehicle according to the first embodiment.

FIG. 11 is a flowchart showing the flow of processes of the steering wheel control unit 330 according to the first embodiment. FIGS. 12 to 14 are cross-sectional views of a vehicle according to the first embodiment.

The steering wheel control unit 330 acquires information on an automated driving mode from the automated driving control unit 100 (the automated driving mode control unit 124) (step S100). Subsequently, the steering wheel control unit 330 determines whether the automated driving mode is a manual mode (step S102). When the automated driving mode is a manual mode (S102: Yes), as shown in FIG. 4, the steering wheel control unit 330 controls the inclination angle of the central axis P so that the rotating portion 315 is in the smallest inclination state (step S104). Moreover, the steering wheel control unit 330 receives the table 310 in the steering wheel body 301 (step S106). In this way, the process ends.

When the automated driving mode is not the manual mode (S102: No), the steering wheel control unit 330 determines whether the automated driving mode is a third mode (step S108). When the automated driving mode is the third mode (step S108: Yes), as shown in FIG. 12, the steering wheel control unit 330 controls the inclination angle of the central axis P so that the inclination angle of the central axis P is in the intermediate state (step S110). Moreover, the steering wheel control unit 330 deploys the table 310 in the small deployment state (step S112). When the table 310 is deployed in the small deployment state, an occupant can operate the steering. In this way, the process ends.

When the automated driving mode is not the third mode (S108: No), the steering wheel control unit 330 determines whether the automated driving mode is a second mode (step S114). When the automated driving mode is the second mode (S114: Yes), as shown in FIG. 13, the steering wheel control unit 330 controls the inclination angle of the central axis P so that the inclination angle of the central axis P is in the intermediate state (step S116). In the example shown in FIG. 13, the steering wheel control unit 330 controls the inclination angle of the central axis P so that a state similar to a case in which the first control unit 120 performs the third automated driving mode is created. Moreover, the steering wheel control unit 330 deploys the table 310 in the large deployment state (step S118). In this way, the process ends.

When the automated driving mode is not the second mode (S114: No), since the automated driving mode is the first mode, as shown in FIG. 14, the steering wheel control unit 330 controls the inclination angle of the central axis P so that the rotating portion 315 is in the largest inclination state (step S120). Subsequently, the flow proceeds to step S118 and the table 310 is deployed in the large deployment state. After that, the process ends.

The control of the inclination angle of the central axis P and the area of the table surface 311 of the table 310 by the steering wheel control unit 330 is not limited to the above-described embodiment, and the inclination angle of the central axis P and the area of the table surface 311 may be changed on the basis of an occupant's instruction. Moreover, the steering wheel control unit 330 may control the inclination angle of the central axis P so that the rotating portion 315 is in the smallest inclination state and the table 310 may be accommodated in the event of an emergency such as when the action plan generation unit 123 activates an emergency stop event. Furthermore, the steering wheel control unit 330 may control the drive device 320 to control the position of the table 310 in the axial direction of the central axis P according to the state of driving assistance being executed in the host vehicle M.

As shown in FIG. 1, the airbag device 400 includes a pair of airbag bodies 401 and 402 that deploys toward a front side of a driver, a plurality of inflators (not shown) provided separately so as to correspond to the respective airbag bodies 401 and 402 to supply gas to the airbag bodies 401 and 402 to deploy the airbag bodies, and an airbag activation control unit 410 (a control unit) that determines an airbag body to be deployed among the airbag bodies 401 and 402 when a condition (deployment condition) that an impact is input to the host vehicle M during a vehicle collision or the like is satisfied.

As shown in FIG. 4, the airbag device 400 is configured to change a deployment direction of an airbag body in relation to the rotating portion 315 depending on the inclination angle of the central axis P. The pair of airbag bodies 401 and 402 include a first airbag body 401 and a second airbag body 402 disposed inside the steering wheel body 301.

Figure 15:
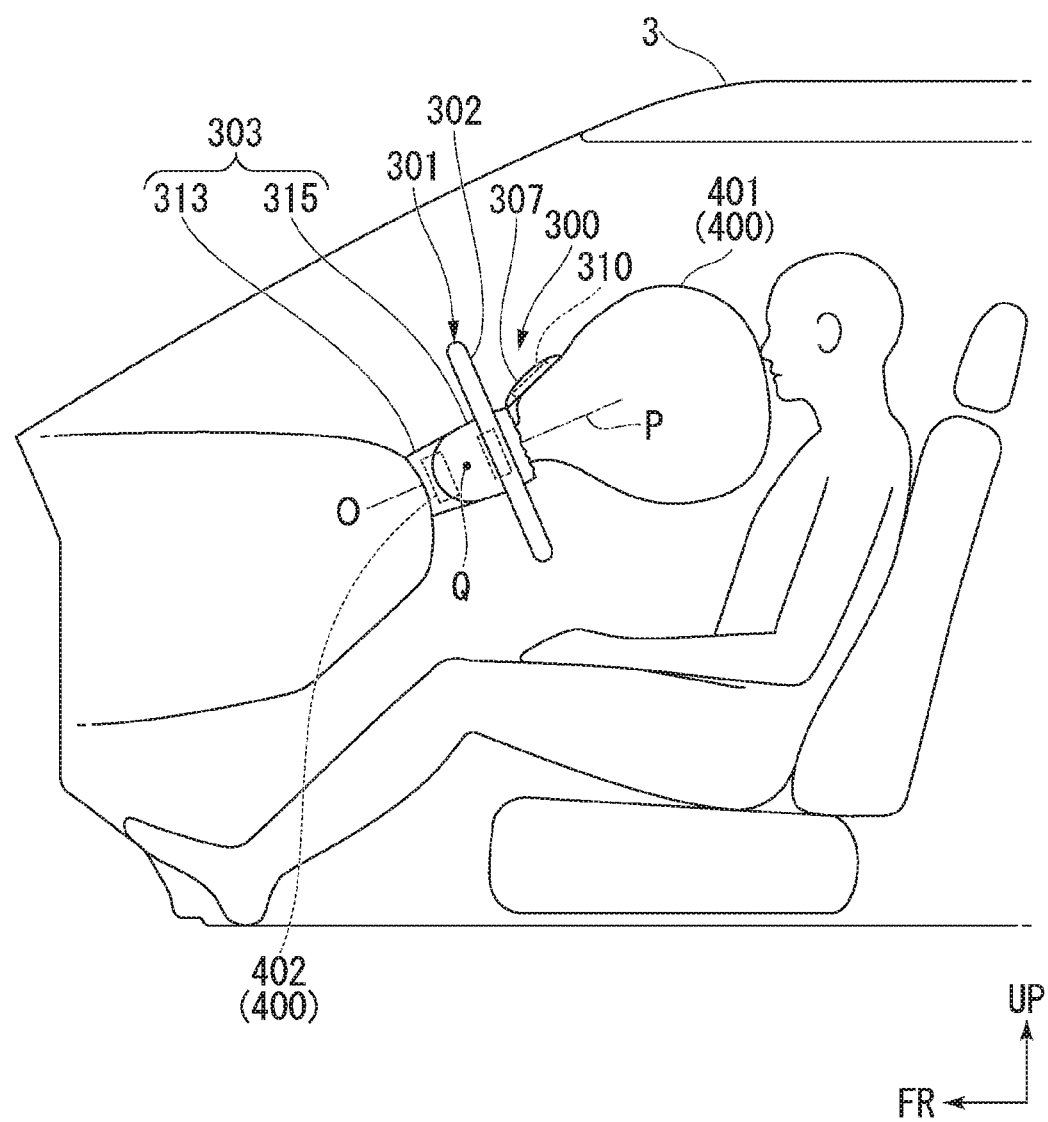
FIG. 15 is an explanatory diagram of a first airbag body 401 according to the first embodiment and is a cross-sectional view of a vehicle in a state in which the first airbag body 401 is deployed.

FIG. 15 is an explanatory diagram of the first airbag body 401 according to the first embodiment and is a cross-sectional view of a vehicle in which the first airbag body 401 is in a deployment state.

As shown in FIGS. 4 and 15, the first airbag body 401 is disposed inside the rotating portion 315 of the hub portion 303. The first airbag body 401 is formed so as to deploy toward the front side of a driver at least in the smallest inclination state of the rotating portion 315. The first airbag body 401 deploys from the front end 307 of the hub portion 303. In this case, the first airbag body 401 deploys in a state in which the front end 307 of the hub portion 303 together with the table 310 is released toward the upper side of the vehicle. In this way, it is possible to suppress the table 310 from coming into contact with a driver during the deployment of the first airbag body 401.

Figure 16:
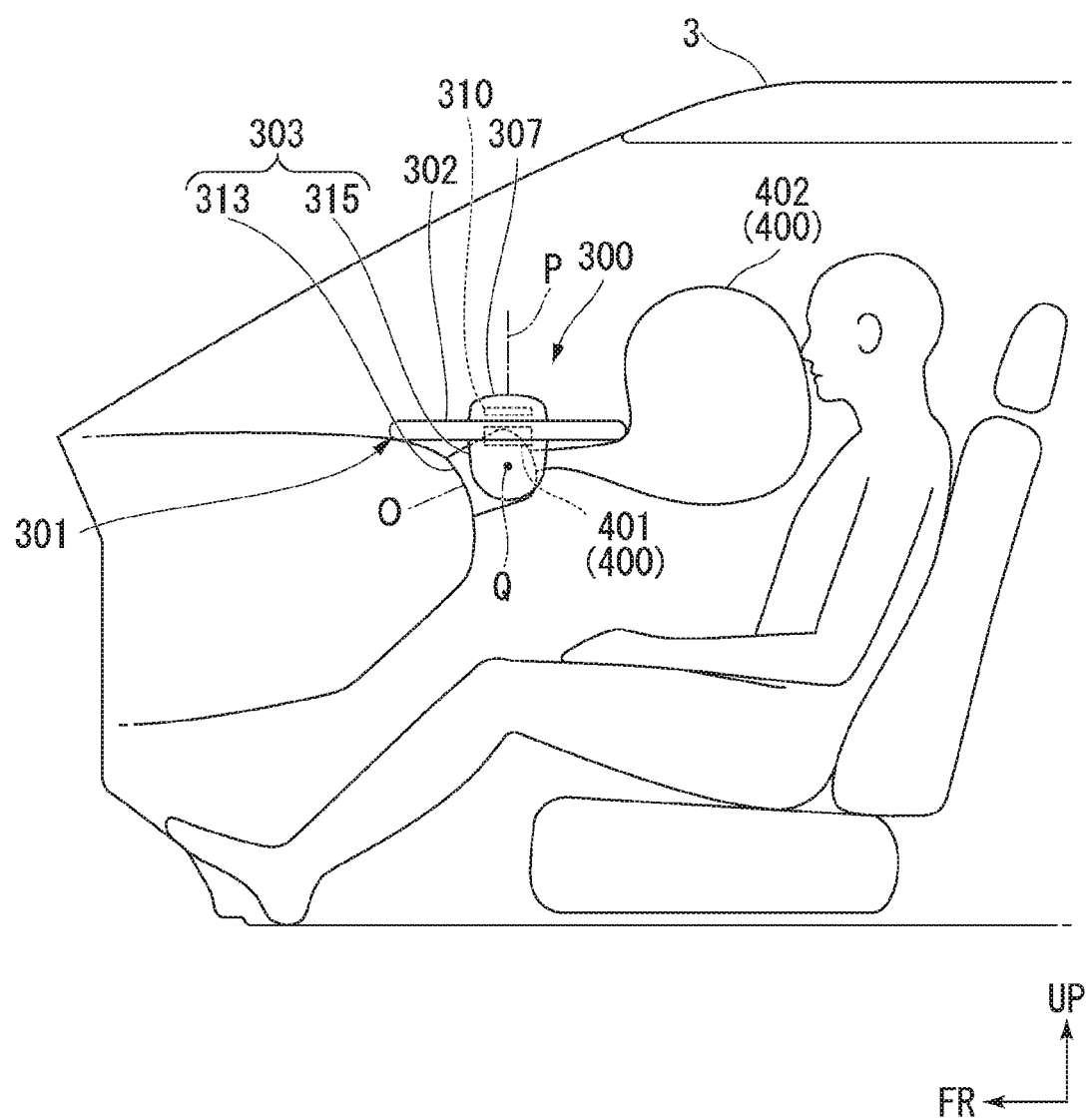
FIG. 16 is an explanatory diagram of a second airbag body 402 according to the first embodiment and is a cross-sectional view of a vehicle in a state in which the second airbag body 402 is deployed.

FIG. 16 is an explanatory diagram of the second airbag body 402 according to the first embodiment and is a cross-sectional view of the vehicle in which the second airbag body 402 is in a deployment state.

As shown in FIGS. 4 and 16, the second airbag body 402 is disposed inside the base portion 313 of the hub portion 303. The second airbag body 402 deploys toward the front side (a vehicle rear side) from the base portion 313 of the hub portion 303. The second airbag body 402 can be deployed toward the front side of a driver in a way that the rotating portion 315 rotates from the smallest inclination state to expose the front-side end surface of the base portion 313.

The airbag activation control unit 410 acquires the inclination angle of the central axis P on the basis of detection results obtained by the inclination angle sensor (not shown) provided in the steering wheel body 301. The airbag activation control unit 410 deploys the airbag bodies 401 and 402 using a first deployment method when the inclination angle of the central axis P is equal to or smaller than a threshold and the deployment condition is satisfied. Moreover, the airbag activation control unit 410 deploys the airbag bodies 401 and 402 using a second deployment method when the inclination angle of the central axis P exceeds the threshold (a second state) and the deployment condition is satisfied. Specifically, the airbag activation control unit 410 inhibits the deployment of the second airbag body 402 when the inclination angle of the central axis P is equal to or smaller than the threshold. Moreover, the airbag activation control unit 410 deploys the first airbag body 401 when the inclination angle of the central axis P is equal to or smaller than the threshold and the deployment condition is satisfied. Moreover, the airbag activation control unit 410 inhibits the deployment of the first airbag body 401 when the inclination angle of the central axis P exceeds the threshold. Furthermore, the airbag activation control unit 410 allows the second airbag body 402 to be deployed when the inclination angle of the central axis P exceeds the threshold and the deployment condition is satisfied. In this way, the second airbag body 402 is formed so as to be deployed in a direction different from the deployment direction of the first airbag body 401 in relation to the rim portion 302. The airbag activation control unit 410 selects an inflator to be operated when the deployment condition is satisfied among the inflators (not shown) provided so as to correspond to the airbag bodies 401 and 402 to thereby inhibit the deployment of one airbag body and to deploy the other airbag body when the deployment condition is satisfied.

The threshold of the inclination angle of the central axis P is the largest inclination angle of the inclination angles at which the first airbag body 401 is deployed toward the front side of the driver when the first airbag body 401 is deployed. In this way, the airbag activation control unit 410 allows the first airbag body 401 to be deployed when the first airbag body 401 is effective in protecting a driver and allows the second airbag body 402 to be deployed when the first airbag body 401 is not effective in protecting the driver.

As described above, according to the present embodiment, since the airbag device 400 changes the deployment method of the airbag bodies 401 and 402 when the inclination angle of the central axis P exceeds the threshold, even when the rim portion 302 is inclined from a state in which the manual driving mode is executed, the airbag bodies 401 and 402 can be always deployed to a position effective for the driver regardless of the inclination angle of the central axis P. Therefore, it is possible to enhance occupant protection performance.

The airbag device 400 has the plurality of airbag bodies 401 and 402 disposed inside the steering wheel body 301, and the airbag activation control unit 410 deploys the second airbag body 402 deployed in a direction different from the deployment direction of the first airbag body 401 in relation to the rim portion 302 when the inclination angle of the central axis P exceeds the threshold and the deployment condition is satisfied. Due to this, the second airbag body 402 can be deployed to a position effective for the driver when the first airbag body 401 is not effective for the driver. Therefore, it is possible to enhance occupant protection performance.

The second airbag body 402 is disposed inside the base portion 313 that supports the rotating portion 315 that is displaced integrally with the rim portion 302 in a displaceable manner. Due to this, the second airbag body 402 can be deployed in a direction different from the deployment direction of the first airbag body 401 in relation to the rim portion 302. Due to this, the second airbag body 402 can be deployed to a position effective for the driver when the first airbag body 401 is not effective for the driver. Therefore, it is possible to enhance occupant protection performance.

Furthermore, since the airbag device 400 inhibits the deployment of the first airbag body 401 when the inclination angle of the central axis P exceeds the threshold, it is possible to prevent the first airbag body 401 from being deployed unnecessarily when the first airbag body 401 is not effective for the driver.

The vehicle M according to the present embodiment includes the airbag device 400, the automated driving control unit 100 that executes driving assistance in the host vehicle M, and the steering wheel control unit 330 that changes the inclination angle of the central axis P according to the state of the driving assistance executed by the automated driving control unit 100. Due to this, even when the steering member is inclined according to the state of driving assistance, the airbag bodies 401 and 402 can be always deployed to a position effective for the driver. Therefore, it is possible to enhance occupant protection performance.

Second Embodiment

Next, a second embodiment will be described.

Figure 17:
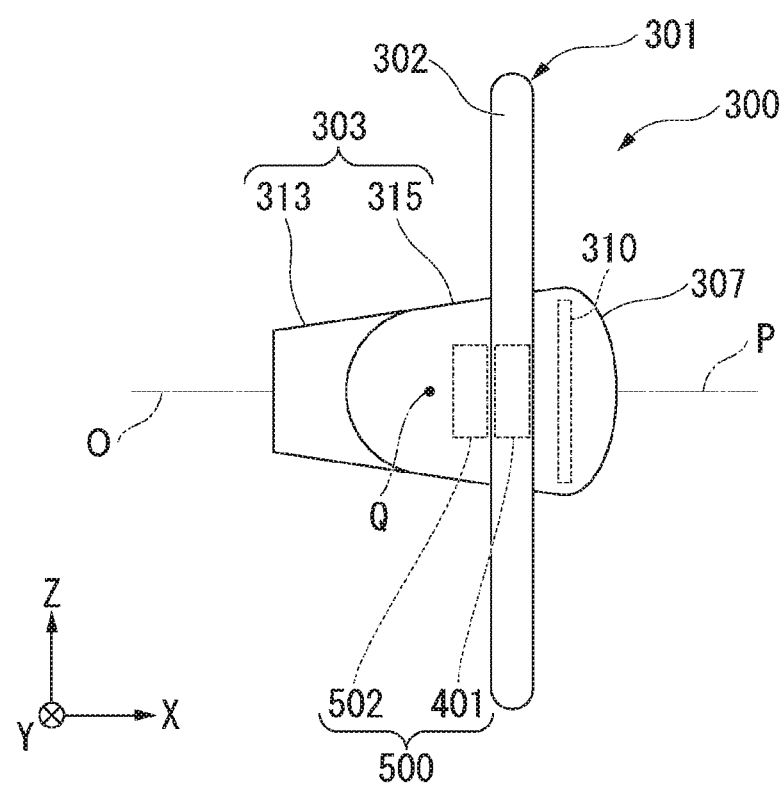
FIG. 17 is an explanatory diagram of the second airbag body 502 according to a second embodiment and is a side view of the steering wheel body 301 corresponding to the perspective view along arrow VI in FIG. 5.
Figure 18:
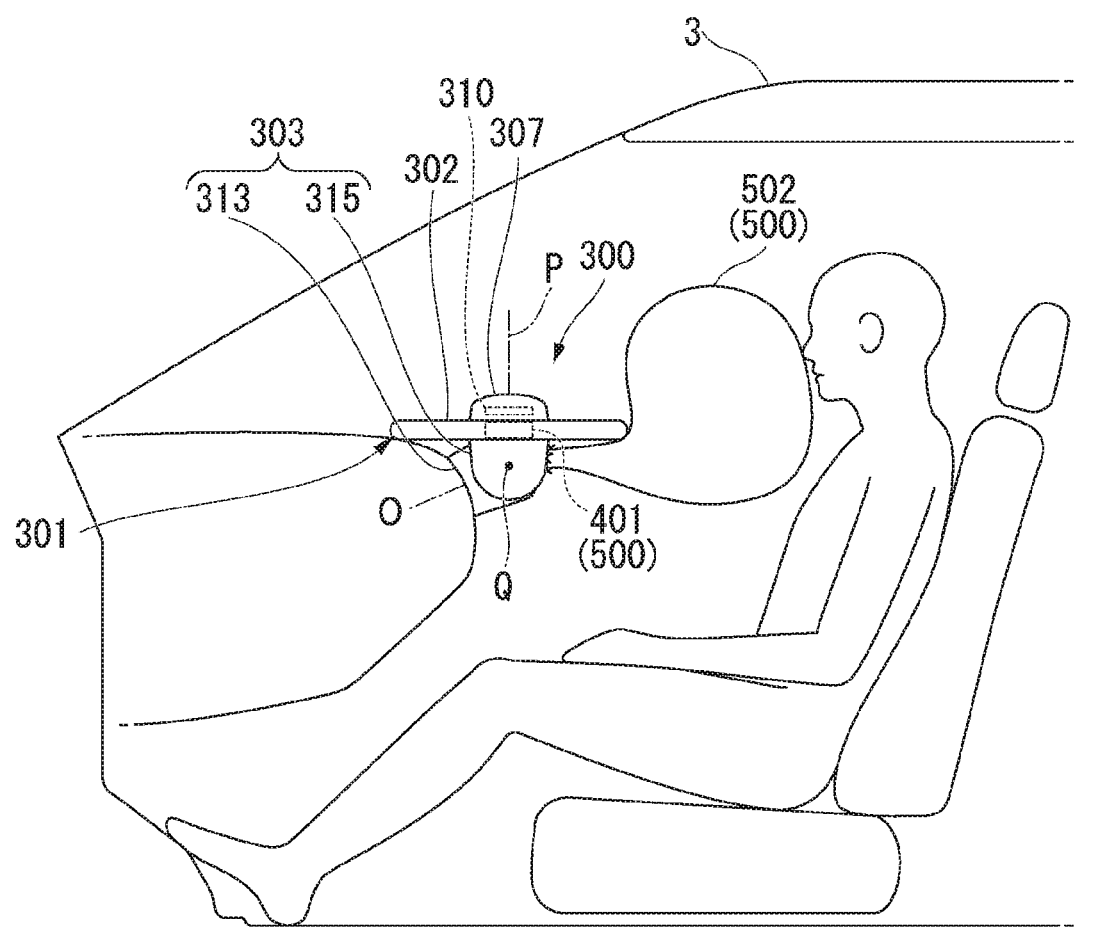
FIG. 18 is an explanatory diagram of the second airbag body 502 according to the second embodiment and is a cross-sectional view of a vehicle in a state in which the second airbag body 502 is deployed.

FIG. 17 is an explanatory diagram of a second airbag body 502 according to a second embodiment and is a side view of the steering wheel body 301 corresponding to a perspective view along arrow VI in FIG. 5. FIG. 18 is an explanatory diagram of the second airbag body 502 according to the second embodiment and is a cross-sectional view of a vehicle in which the second airbag body 502 is in a deployment state.

In the first embodiment shown in FIG. 6, the first airbag body 401 is disposed inside the rotating portion 315 of the hub portion 303, and the second airbag body 402 is disposed inside the base portion 313 of the hub portion 303. In contrast, the second embodiment shown in FIG. 17 is different from the first embodiment in that both the first airbag body 401 and the second airbag body 502 are disposed inside the rotating portion 315 of the hub portion 303. The same components as those of the first embodiment will be denoted by the same reference numerals and a detailed description thereof will be omitted (the same is true for the following embodiment).

As shown in FIG. 1, an airbag device 500 includes the first airbag body 401 and the second airbag body 502 that deploy toward a front side of a driver, a plurality of inflators (not shown) provided separately so as to correspond to the respective airbag bodies 401 and 502 to supply gas to the airbag bodies 401 and 502 to deploy the airbag bodies, and an airbag activation control unit 510 that determines an airbag body to be deployed among the airbag bodies 401 and 502 when an impact is input to the host vehicle M.

As shown in FIGS. 17 and 18, the second airbag body 502 is disposed inside the rotating portion 315 of the hub portion 303 on the back side of the first airbag body 401. The second airbag body 502 is formed so as to deploy toward the front side of the driver at least in the largest inclination state of the rotating portion 315. The second airbag body 502 is formed so as to be deployed in a direction different from the deployment direction of the first airbag body 401 in relation to the rim portion 302.

The airbag activation control unit 510 changes the deployment method of the airbag bodies 401 and 502 when the inclination angle of the central axis P exceeds the threshold. Specifically, the airbag activation control unit 510 inhibits the deployment of the second airbag body 502 when the inclination angle of the central axis P is equal to or smaller than the threshold. Moreover, the airbag activation control unit 510 deploys the first airbag body 401 when the inclination angle of the central axis P is equal to or smaller than the threshold and the deployment condition is satisfied. Moreover, the airbag activation control unit 510 inhibits the deployment of the first airbag body 401 when the inclination angle of the central axis P exceeds the threshold. Furthermore, the airbag activation control unit 510 deploys the second airbag body 502 when the inclination angle of the central axis P exceeds the threshold and the deployment condition is satisfied. The threshold of the inclination angle of the central axis P is the same as that of the first embodiment. In this way, the airbag activation control unit 510 allows the first airbag body 401 to be deployed when the first airbag body 401 is effective in protecting a driver and allows the second airbag body 502 to be deployed when the first airbag body 401 is not effective in protecting the driver.

As described above, in the present embodiment, both the first airbag body 401 and the second airbag body 502 are disposed inside the rotating portion 315 of the hub portion 303. Due to this, the deployment direction of the first airbag body 401 and the deployment direction of the second airbag body 502 change according to the inclination angle of the central axis P. Therefore, by forming the second airbag body 502 so that the deployment direction thereof is directed toward the driver in a state in which the inclination angle of the central axis P exceeds the threshold, the second airbag body 502 can be deployed to a position effective for the driver when the first airbag body 401 is not effective for the driver. Therefore, it is possible to enhance occupant protection performance.

Third Embodiment

Next, a third embodiment will be described.

Figure 19:
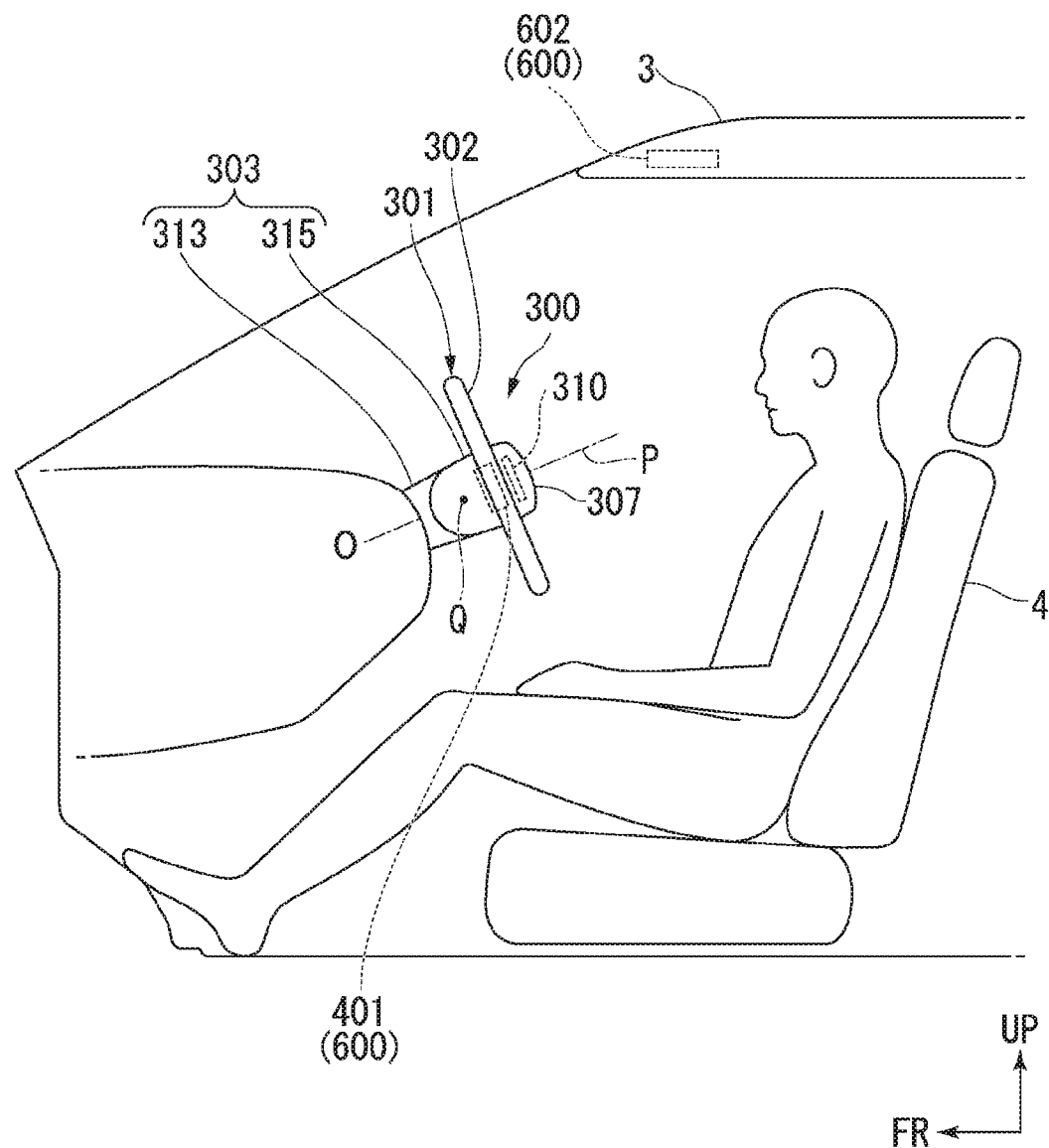
FIG. 19 is a cross-sectional view of a vehicle according to a third embodiment.
Figure 20:
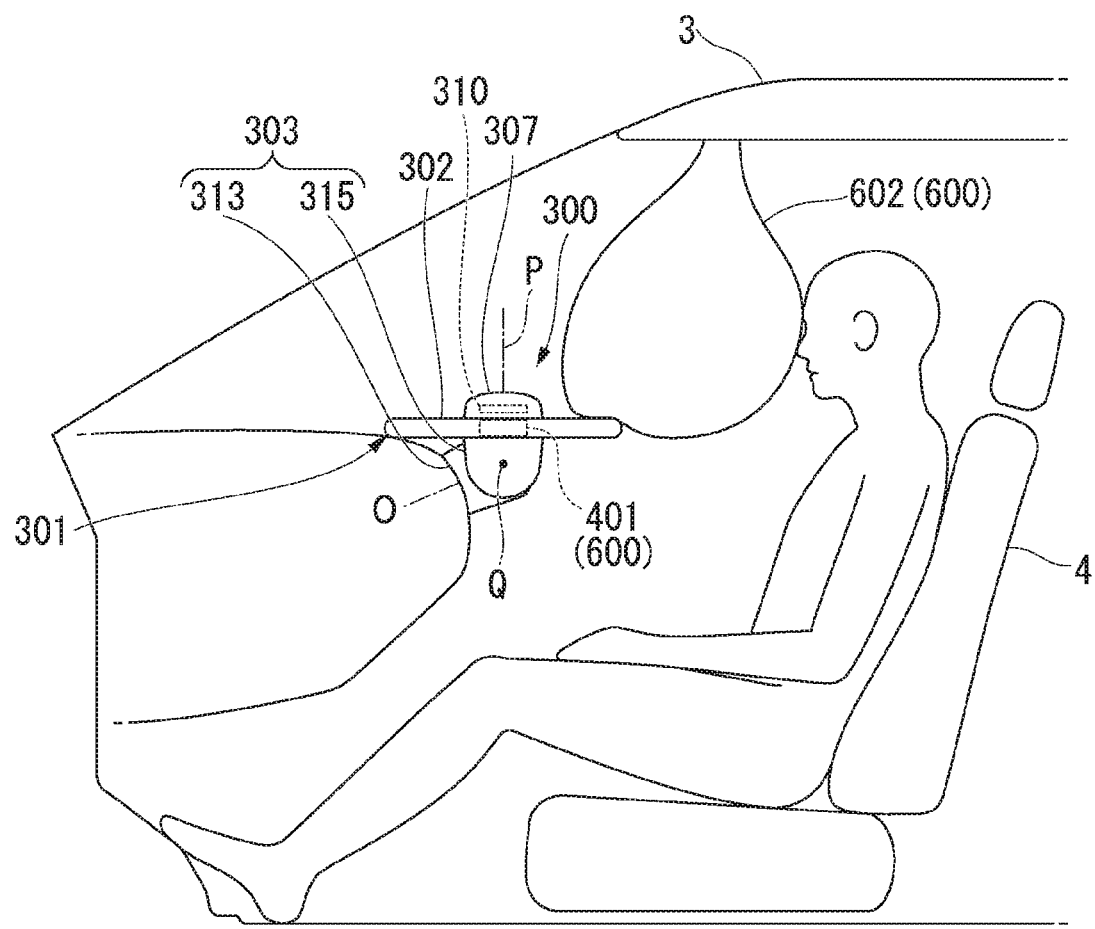
FIG. 20 is an explanatory diagram of a second airbag body 602 according to the third embodiment and is a cross-sectional view of a vehicle in a state in which the second airbag body 602 is deployed.

FIG. 19 is a cross-sectional view of a vehicle according to a third embodiment. FIG. 20 is an explanatory diagram of a second airbag body 602 according to the third embodiment and is a cross-sectional view of a vehicle in which the second airbag body 602 is in the deployment state.

In the first embodiment shown in FIG. 4, the second airbag body 402 is disposed inside the base portion 313 of the hub portion 303. In contrast, the third embodiment shown in FIG. 19 is different from the first embodiment in that the second airbag body 602 is disposed in a position other than the steering wheel body 301 of the host vehicle M.

As shown in FIG. 1, an airbag device 600 includes the first airbag body 401 and the second airbag body 602 that deploy toward a front side of a driver, a plurality of inflators (not shown) provided separately so as to correspond to the respective airbag bodies 401 and 602 to supply gas to the airbag bodies 401 and 602 to deploy the airbag bodies, and an airbag activation control unit 610 that determines an airbag body to be deployed among the airbag bodies 401 and 602 when an impact is input to the host vehicle M.

As shown in FIGS. 19 and 20, the second airbag body 602 is, for example, disposed inside a roof 3 of the vehicle on the front side of the head of a driver sitting on the driver's seat 4 in a normal posture. The second airbag body 602 breaks the roof 3 to deploy downward toward the front-side position of the driver's seat 4 from the upper side of the driver's seat 4. Here, the second airbag body 602 may be disposed inside the door for the driver's seat 4 and may be formed so as to be deployed toward the front-side position of the driver's seat 4 from the lateral side of the driver's seat 4.

The airbag activation control unit 610 changes the deployment method of the airbag bodies 401 and 602 when the inclination angle of the central axis P exceeds the threshold. Specifically, the airbag activation control unit 610 inhibits the deployment of the second airbag body 602 when the inclination angle of the central axis P is equal to or smaller than the threshold. Moreover, the airbag activation control unit 610 deploys the first airbag body 401 when the inclination angle of the central axis P is equal to or smaller than the threshold and the deployment condition is satisfied. Moreover, the airbag activation control unit 610 inhibits the deployment of the first airbag body 401 when the inclination angle of the central axis P exceeds the threshold. Furthermore, the airbag activation control unit 610 deploys the second airbag body 602 when the inclination angle of the central axis P exceeds the threshold and the deployment condition is satisfied. The threshold of the inclination angle of the central axis P is the same as that of the first embodiment. In this way, the airbag activation control unit 610 allows the first airbag body 401 to be deployed when the first airbag body 401 is effective in protecting a driver and allows the second airbag body 602 to be deployed when the first airbag body 401 is not effective in protecting the driver.

As described above, in the present embodiment, the first airbag body 401 is disposed inside the rotating portion 315 of the hub portion 303, the second airbag body 602 is formed so as to be deployed toward the front-side position of the driver's seat 4 from the upper side (the inside of the roof 3) or the lateral side (the inside of a door) of the driver's seat 4, and the airbag activation control unit 610 deploys the second airbag body 602 when the inclination angle of the central axis P exceeds the threshold and the deployment condition is satisfied. According to this configuration, when the inclination angle of the central axis P exceeds the threshold and the first airbag body 401 disposed inside the rotating portion 315 of the hub portion 303 is not effective for the driver, the second airbag body 602 can be deployed to a position effective for the driver. Therefore, it is possible to enhance occupant protection performance.

The present invention is not limited to the embodiments described with reference to the drawings, and various modifications can be made within the technical scope of the invention.

For example, in the above-described embodiments, although the airbag device 400, 500, or 600 includes a pair of airbag bodies, the present invention is not limited thereto, and the airbag device may include three or more airbag bodies.

In the above-described embodiments, although the rotating portion 315 and the rim portion 302 are provided so as to be rotatable about the rotary axis Q extending in the vehicle width direction, the rotating portion and the rim portion, for example, may be provided so as to be rotatable about an axis extending in the vehicle up-down direction.

Moreover, in the above-described embodiments, although a configuration in which the steering wheel 300 includes the table 310 has been described as an example, the present invention is not limited thereto, and a steering wheel may not include a table.

In addition, the components of the above-described embodiment can be appropriately replaced with well-known components without departing from the spirit of the present invention and the above-described embodiments may be appropriately combined with each other.

INDUSTRIAL APPLICABILITY

According to the above-described airbag device, since the deployment method of the airbag body is changed when the inclination angle of the central axis of the rim portion exceeds the threshold, the airbag body can be always deployed to a position effective for the driver regardless of the inclination angle of the central axis of the rim portion even when the rim portion is inclined from the first state. Therefore, it is possible to enhance occupant protection performance.

REFERENCE SIGNS LIST

3 Roof
4 Driver's seat
100 Automated driving control unit (Automated driving controller)
300 Steering wheel (Steering member)
302 Rim portion
313 Base portion (Second member)
315 Rotating portion (First member, member)
330 Steering wheel control unit (Inclination control unit)
400, 500, 600 Airbag device
401 First airbag body (Airbag body)
402, 502, 602 Second airbag body (Airbag body)
410 Airbag activation control unit (Control unit)
M Vehicle
O Rotation axis
P Central axis

What is claimed is:
1. An airbag device comprising:
an airbag body that is configured to deploy toward a front side of a driver; and
a control unit that is configured to deploy the airbag body using a first deployment method when a central axis of a rim portion of a steering member of a vehicle is in a first state and a deployment condition is satisfied and deploy the airbag body using a second deployment method in a second state when an inclination angle of the central axis in relation to the central axis in the first state exceeds a threshold and the deployment condition is satisfied, wherein
the airbag body includes a first airbag body and a second airbag body disposed inside the steering member,
the second airbag body is formed to be deployed in a direction different from a deployment direction of the first airbag body in relation to the rim portion, and
the control unit is configured to deploy the second airbag body when the inclination angle exceeds the threshold and the deployment condition is satisfied.
2. The airbag device according to claim 1, wherein the inclination angle is an angle about an axis extending in a vehicle width direction.
3. The airbag device according to claim 1, wherein the first airbag body is disposed inside a first member of the steering member, which is displaced integrally with the rim portion, and
the second airbag body is disposed inside a second member of the steering member, which supports the first member so as to be displaceable.
4. The airbag device according to claim 1, wherein the first airbag body and the second airbag body are disposed inside a member of the steering member, which is displaced integrally with the rim portion.
5. The airbag device according to claim 1, wherein the deployment of the first airbag body is inhibited when the inclination angle exceeds the threshold.

6. A vehicle comprising:
the airbag device according to claim 1;
an automated driving controller that is configured to execute driving assistance in a host vehicle; and
an inclination control unit that is configured to change the inclination angle according to a state of driving assistance executed by the automated driving controller.

* * * * *